(12) United States Patent
Matsushita

(10) Patent No.: US 10,162,536 B2
(45) Date of Patent: *Dec. 25, 2018

(54) STORAGE APPARATUS AND STORAGE CONTROL METHOD

(71) Applicant: Hitachi, Ltd., Tokyo (JP)

(72) Inventor: Takaki Matsushita, Tokyo (JP)

(73) Assignee: Hitachi, Ltd., Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 15/639,496

(22) Filed: Jun. 30, 2017

(65) Prior Publication Data
US 2017/0300242 A1    Oct. 19, 2017

Related U.S. Application Data

(63) Continuation of application No. 14/777,555, filed as application No. PCT/JP2013/069613 on Jul. 19, 2013, now Pat. No. 9,727,255.

(51) Int. Cl.
*G06F 3/06* (2006.01)
*G06F 12/02* (2006.01)

(52) U.S. Cl.
CPC .......... *G06F 3/0616* (2013.01); *G06F 3/0647* (2013.01); *G06F 3/0655* (2013.01);
(Continued)

(58) Field of Classification Search
CPC .... G06F 3/0616; G06F 3/0655; G06F 3/0688; G06F 3/0647; G06F 12/0246; G06F 2212/7201
See application file for complete search history.

(56) References Cited

U.S. PATENT DOCUMENTS 5,235,695 A * 8/1993 Pence ................. G11B 20/10
                                                 360/134
5,305,295 A    4/1994 Chu
(Continued)

FOREIGN PATENT DOCUMENTS

JP    2007-265265 A    10/2007
JP    2008-112276 A     5/2008
(Continued)

OTHER PUBLICATIONS

International Search Report and Written Opinion of PCT/JP2013/069613 dated Oct. 1, 2013.
(Continued)

*Primary Examiner* — Reginald G Bragdon
*Assistant Examiner* — Mehdi Namazi
(74) *Attorney, Agent, or Firm* — Mattingly & Malur, PC

(57) ABSTRACT

A storage apparatus includes a semiconductor storage device, and a storage controller coupled to the semiconductor storage device, and which stores data to a logical storage area provided by the semiconductor storage device. The semiconductor storage device includes one or more nonvolatile semiconductor storage media, and a medium controller coupled to the semiconductor storage media. The medium controller compresses data stored in the logical storage area, and stores the compressed data in the semiconductor storage medium. The size of a logical address space of the logical storage area is larger than a total of the sizes of physical address spaces of the semiconductor storage media.

8 Claims, 37 Drawing Sheets

(52) U.S. Cl.
CPC ........ *G06F 3/0688* (2013.01); *G06F 12/0246* (2013.01); *G06F 2212/7201* (2013.01)

(56) References Cited

U.S. PATENT DOCUMENTS

| | | | |
|---|---|---|---|
| 9,110,599 B1* | 8/2015 | Fair | G06F 3/0644 |
| 9,122,588 B1 | 9/2015 | Modal et al. | |
| 2004/0044854 A1* | 3/2004 | Gibble | G06F 3/0608 |
| | | | 711/154 |
| 2004/0230724 A1* | 11/2004 | Stager | G06F 3/0605 |
| | | | 710/68 |
| 2007/0150690 A1 | 6/2007 | Chen et al. | |
| 2008/0104350 A1 | 5/2008 | Shimizu et al. | |
| 2010/0211620 A1 | 8/2010 | Matsuzawa et al. | |
| 2012/0072641 A1 | 3/2012 | Suzuki et al. | |
| 2012/0137087 A1 | 5/2012 | Umimura | |
| 2014/0013068 A1 | 1/2014 | Yamato et al. | |
| 2014/0149711 A1 | 5/2014 | Shiga | |
| 2014/0172325 A1* | 6/2014 | Naji | G06F 11/008 |
| | | | 702/34 |
| 2014/0325127 A1 | 10/2014 | Tanaka et al. | |
| 2015/0100728 A1 | 4/2015 | Yamamoto et al. | |

FOREIGN PATENT DOCUMENTS

| | | |
|---|---|---|
| JP | 2010-191670 A | 9/2010 |
| JP | 2012-118587 A | 6/2012 |
| WO | 2010/086900 A1 | 8/2010 |
| WO | 2011/010344 A1 | 1/2011 |
| WO | 2012/124100 A1 | 9/2012 |
| WO | 2013/084267 A1 | 6/2013 |

OTHER PUBLICATIONS

Sueyasu, T., The Favorite of the Next Generation File System, Complete Application of "BTRFS", Nikkei Linux, Jun. 8, 2009, p. 63-76, vol. 11.

Japanese Office Action received in corresponding Japanese Application No. 2015-527122 dated Feb. 7, 2017.

* cited by examiner

| Disk# | Disk type | Information updated date | Remaining warranty period | Expected remaining life | Compression configuration | FM read total amount | FM write total mount | Average compression ratio | Remaining number of times of deletion | FM use amount | Physical capacity | Logical capacity |
|---|---|---|---|---|---|---|---|---|---|---|---|---|
| 0 | SSD (SLC) | yy.mm.dd | 1460 day | 3000 day | ON | 10 GB | 123 GB | 30% | 95 % | 50GB | 1TB | 8TB |
| 1 | SSD (SLC) | | | | | | | | | | | |
| 2 | SSD (MLC) | | | | | | | | | | | |
| n | SSD (MLC) | | | | OFF | | | — | 50% | — | 1TB | — |
| m | HDD | | — | — | | | | | — | — | 1TB | |

13101 13102 13103 13104 13105 13106 13107 13108 13109 13110 13111 13112 13113

Disk management TBL
13100

Fig. 9

| RG# | Disk type | RAID Level | RAID configuration | Compression configuration | Disk# | | |
|---|---|---|---|---|---|---|---|
| 0 | SSD (SLC) | RAID 5 | 3D + 1P | ON | 1 | ... | — |
| 1 | SSD (SLC) | RAID 6 | 6D + 2P | ON | 33 | ... | 40 |
| 2 | SSD (MLC) | RAID 1 | 3D + 3P | OFF | | ... | |
| 3 | SSD (MLC) | RAID 1+0 | — | — | | ... | |
| n | HDD | RAID 5 | 7D + 1P | OFF | | ... | |

RG management TBL
13200

Fig. 10

Pool management TBL ~13300

| Pool# | RG# | RG remaining amountcapacity | Pool remaining capacity |
|---|---|---|---|
| 0 | 0 | 123 GB | 3456 GB |
| | 1 | 234 GB | |
| | 2 | 321 GB | |
| | 3 | 456 GB | |
| | n | n | |

| Disk# | Entry # | Size | Start-LBA | Last-LBA | Allocation destination extent # |
|---|---|---|---|---|---|
| 0 | 0 | 12MB | 0 | 100 | 100 |
| | 1 | 12MB | 120 | 220 | 220 |
| | 2 | 12MB | 2 | 102 | 102 |
| | 3 | 12MB | 4321 | 4421 | N/A |
| | n | 12MB | n | m | n |

Entry management TBL — 13800

13801 Disk#
13802 Entry #
13803 Size
13804 Start-LBA
13805 Last-LBA
13806 Allocation destination extent #

Fig. 12

| Extent # | Size | Disk# | Allocation entry # |
|---|---|---|---|
| 0 | 1GB | 0 | 0 |
| | | ... | ... |
| | | k | k |
| | | n | n |
| | | ... | ... |
| | | m | m |

13401  13402  13403  13404

Extent management TBL — 13400

Fig. 13

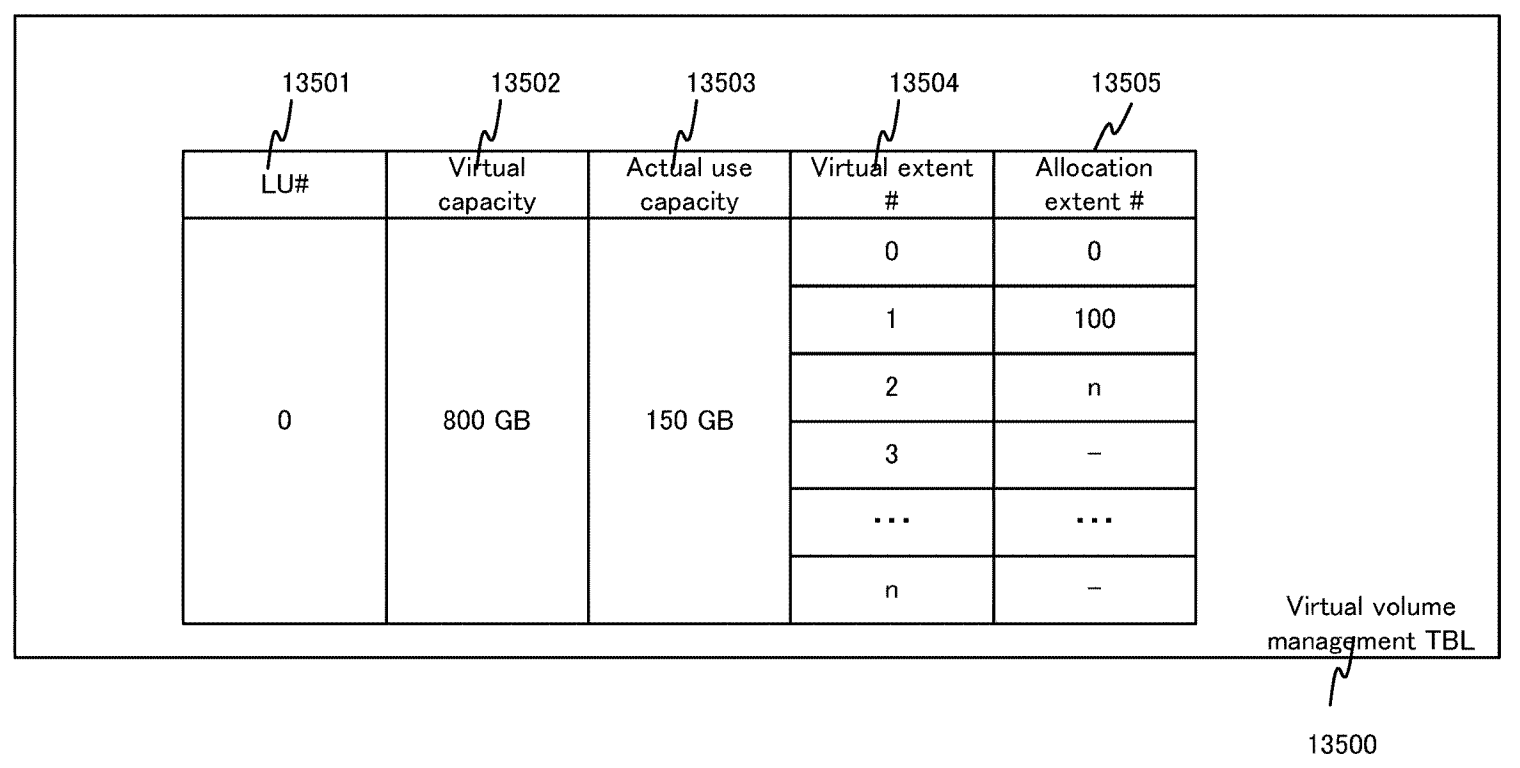

| LU# | Virtual capacity | Actual use capacity | Virtual extent # | Allocation extent # |
|---|---|---|---|---|
| 0 | 800 GB | 150 GB | 0 | 0 |
| | | | 1 | 100 |
| | | | 2 | n |
| | | | 3 | - |
| | | | ... | ... |
| | | | n | - |

Virtual volume management TBL 13500

Fig. 14

| Disk# | Entry # | Ave WR I/O Size | Ave RD I/O Size | WR ratio | WR amount | RD amount |
|---|---|---|---|---|---|---|
| 0 | 1 | 4KB | 4KB | 80% | 20MB | 1MB |
|  | 2 | 64KB | 64KB | 20% | 100MB | 500MB |
| ... | ... | ... | ... | ... | ... | ... |

Statistical information management TBL — 13600

Fig. 15

| Disk# | Entry # | WR amount | Compression ratio | FM WR expected amount |
|---|---|---|---|---|
| 0 | 1 | 50MB | 50% | 25MB |
| | 2 | 100MB | | 50MB |
| | ... | ... | | ... |
| | n | n | | n MB |

13701, 13702, 13703, 13704, 13705

FM WR amount expectation TBL — 13700

Fig. 16

| Start-LBA | Block# | Page# | CW# |
|---|---|---|---|
| 0 | 0 | 0 | 0 |
| 8192 | 0 | 0 | 4 |
| 16384 | 1 | 0 | 2 |
| 24576 | N/A | N/A | N/A |
| ... | | | |
| n | n | n | n |

Logical-physical conversion TBL ~ 23100

23101 Start-LBA
23102 Block#
23103 Page#
23104 CW#

Fig. 18

| 23211 | 23212 | 23213 | 23214 | 23215 | 23216 |
|---|---|---|---|---|---|
| Write request total amount | Read request total amount | FM write total amount | Average compression ratio | FM read total amount | Remaining number of times of deletion |
| 123 GB | 45 GB | 74 GB | 60% | 20 GB | 1234567 |

Statistical information management TBL 23200

Fig. 19

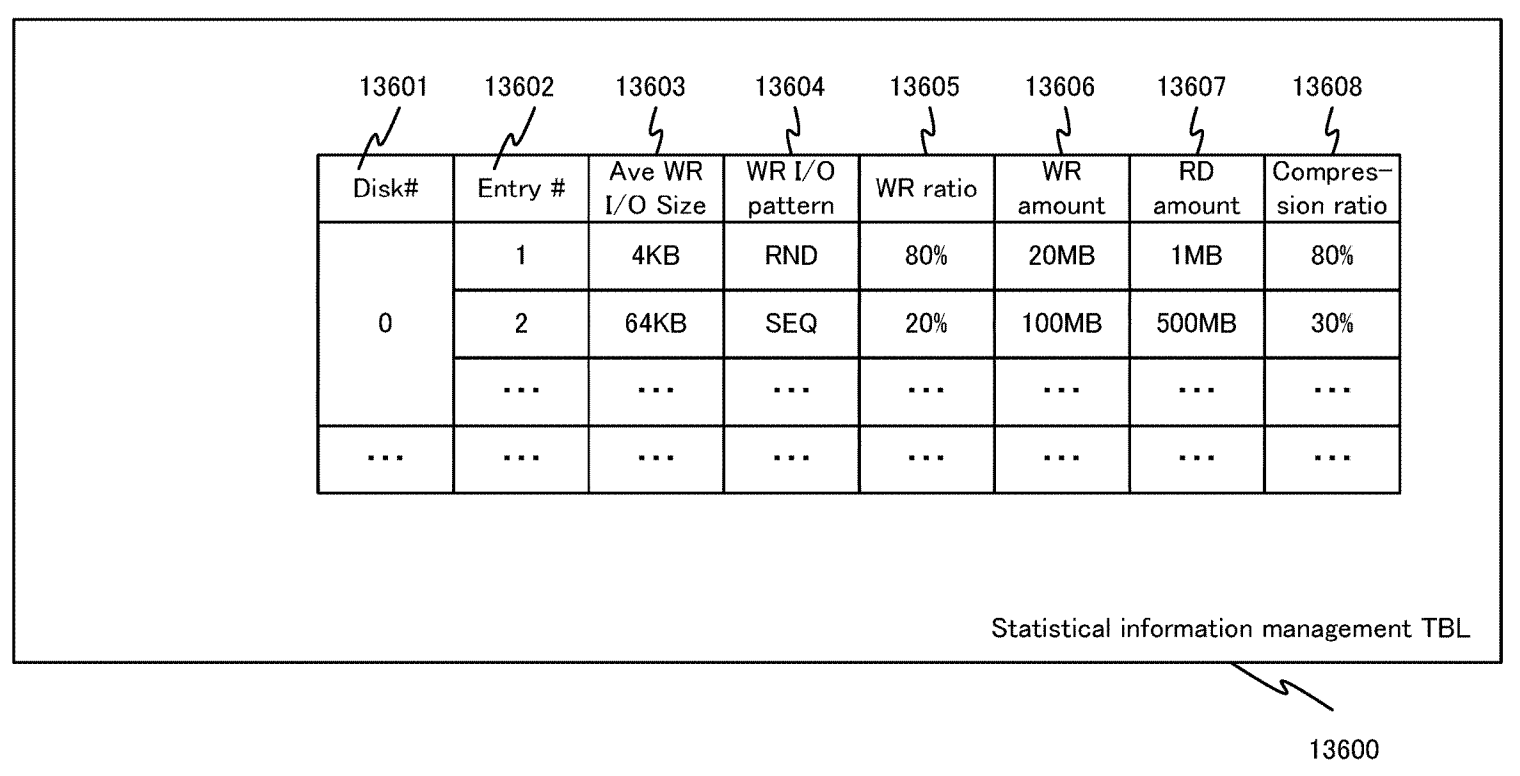

| Disk# | Entry # | Ave WR I/O Size | WR I/O pattern | WR ratio | WR amount | RD amount | Compression ratio |
|---|---|---|---|---|---|---|---|
| 0 | 1 | 4KB | RND | 80% | 20MB | 1MB | 80% |
| | 2 | 64KB | SEQ | 20% | 100MB | 500MB | 30% |
| ... | ... | ... | ... | ... | ... | ... | ... |

Statistical information management TBL 13600

Fig. 30

FM WR amount expectation TBL 13700

| Disk# 13701 | Entry # 13702 | WR amount 13703 | Compression ratio 13704 | FM WR expected amount 13705 |
|---|---|---|---|---|
| 0 | 1 | 50MB | 80% | 40MB |
| | 2 | 100MB | 30% | 30MB |
| | ... | ... | ... | ... |
| | n | n | n | n MB |

Fig. 31

| 13101 | 13102 | 13103 | 13104 | 13105 | 13106 | 13107 | 13108 | 13109 | 13110 | 13111 | 13112 | 13113 | 13114 |
|---|---|---|---|---|---|---|---|---|---|---|---|---|---|
| Disk# | Disk type | Information updated date | Remaining warranty period | Expected remaining life | Compression configuration | FM read total amount | FM write total amount | Average compression ratio | Remaining number of times of deletion | FM use amount | Physical capacity | Logical capacity | WA |
| 0 | SSD (SLC) | yy.mm.dd | 1460 day | 3000 day | ON | 10 GB | 123 GB | 30% | 95 % | 50GB | 1TB | 8TB | 2.0 |
| 1 | SSD (SLC) | | | | | | | | | | | | 1.5 |
| 2 | SSD (MLC) | | | | OFF | | | | 50% | | | | |
| n | SSD (MLC) | | | | | | | — | — | — | 1TB | — | 3.0 |
| m | HDD | | — | — | | | | | | | 1TB | | N/A |

Disk management TBL
13100

Fig. 34

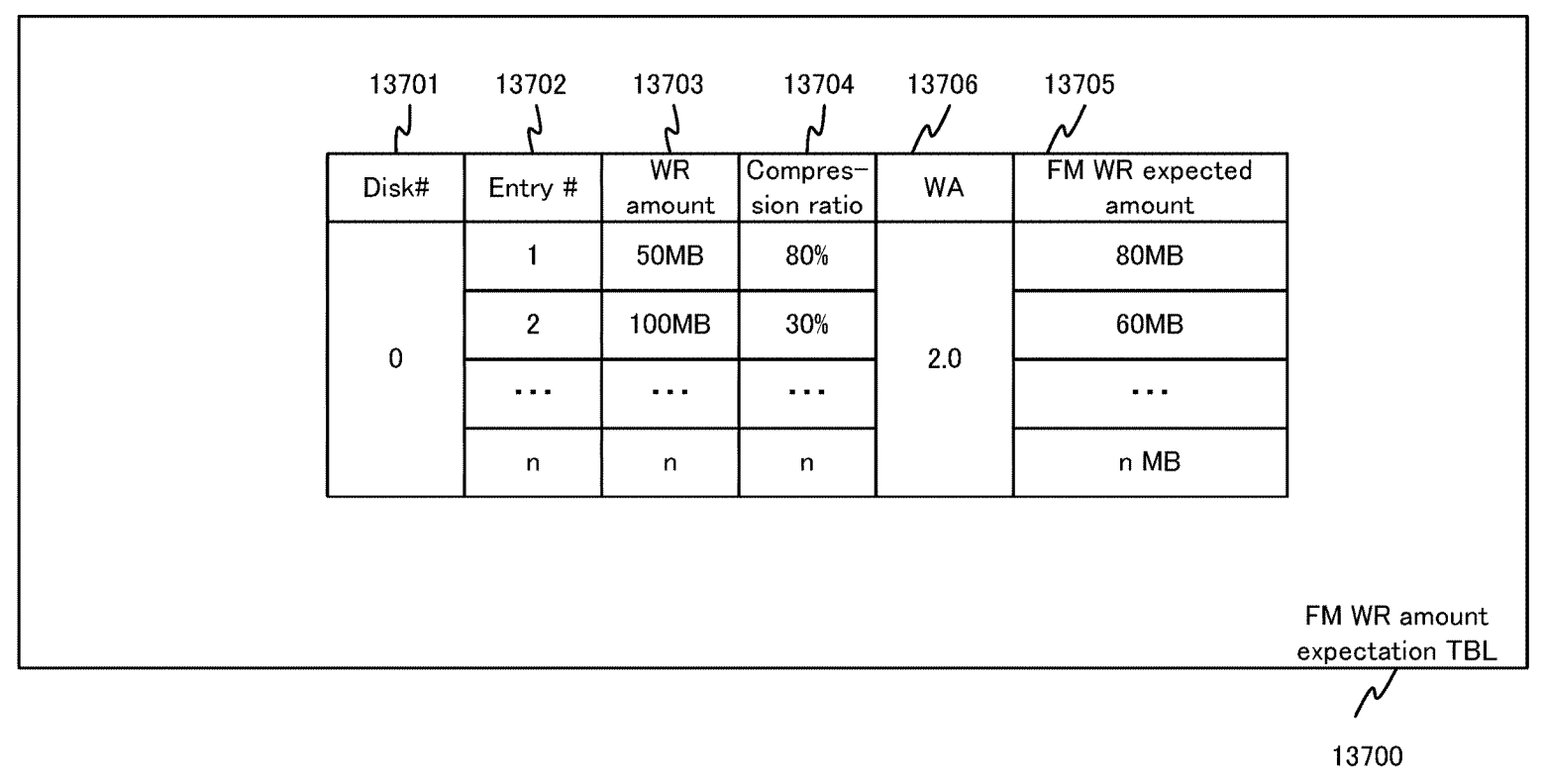

| Disk# | Entry # | WR amount | Compression ratio | WA | FM WR expected amount |
|---|---|---|---|---|---|
| 0 | 1 | 50MB | 80% | 2.0 | 80MB |
| | 2 | 100MB | 30% | | 60MB |
| | ... | ... | ... | | ... |
| | n | n | n | | n MB |

FM WR amount expectation TBL 13700

Fig. 35

STORAGE APPARATUS AND STORAGE CONTROL METHOD

TECHNICAL FIELD

The present invention relates to storage control of a storage apparatus including a plurality of non-volatile semiconductor storage devices.

BACKGROUND ART

A storage apparatus typically includes a physical storage device that stores data and a controller that controls the physical storage device. The controller provides a computer (for example, a host computer) coupled with the storage apparatus with a data storage space (typically, a logical volume).

The storage apparatus can speed up I/O processing and can exhibit high fault-tolerance against a breakdown of the physical storage device, by using a plurality of physical storage devices in redundant array of independent (or inexpensive) disks (RAID) configuration.

The storage apparatus typically includes a hard disk drive (HDD) as the physical storage device. However, in recent years, as a new physical storage device replacing the HDD, a physical storage device including a flash memory (hereinafter, FM), for example, a solid state drive (SSD) has attracted attention.

The SSD has an advantage of extreme higher-speed I/O processing than the HDD. However, the SSD has a disadvantage of shorter life than the HDD because the number of times of data write has an upper limit. Hereinafter, the disadvantage of the SSD will be described.

When intending to rewrite data, a flash memory (typically, a NAND-type flash memory) cannot directly overwrite a physical area in which the data is stored with data. To rewrite the data on the physical area with data, it is necessary to execute deletion processing (hereinafter, block deletion) for the data on the physical area in units of called block that is a deletion unit of the flash memory, and then to write the data on the physical area subjected to the block deletion.

However, the number of times of the block deletion for each block (hereinafter, the number of times of deletion) has limitations in terms of a physical restriction of the flash memory. If the number of times of deletion of the block exceeds the limitations, the data cannot be stored in the block. That is, if the number of times of deletion of all of blocks that configure the SSD exceeds the limitations, the SSD ends its life.

Therefore, in a typically SSD, life prolongation of the SSD is performed using a technique called wear leveling (hereinafter, WL). In WL, typically, data that is updated at a low frequency is stored in a block having a large number of times of deletion, and data that is updated at a high frequency is stored in a block having a small number of times of deletion. Accordingly, the numbers of times of deletion among the blocks are leveled, and deterioration of a specific block can be suppressed.

In a case where the SSD is employed as the physical storage device of the storage apparatus, it is typical to mount a plurality of SSDs in the storage apparatus. In such a storage apparatus, even if the deterioration of only a specific block is suppressed in each SSD, loads among the SSD become unbalanced, and only a specific SSD may be overloaded. Therefore, a technique of realizing the life prolongation of the entire storage apparatus by leveling the number of times of deletion among the plurality of SSDs by applying WL to the SSDs is disclosed in PTL 1 and PTL 2. Hereinafter, WL performed among the physical storage devices such as the SSDS is referred to as "life leveling".

In the life leveling, a controller (hereinafter, storage controller) of the storage apparatus determines an SSD of a migration target and data of a migration target.

According to PTL 1, the storage controller stores a total amount of data write (hereinafter, WR) performed for the SSD, as statistical information, and expects an average number of times of deletion by dividing the total amount by a physical capacity of the SSD, and determines the migration target data.

According to PTL 2, the storage controller acquires internal information such as the number of times of deletion and a data WR amount from the SSD in details at a block level, and determines the migration target data, based on the information.

Next, data compression will be described. The data compression is a technology of reducing the data amount to be stored in the physical storage device by compression of data, and realizes reduction in footprint and a decrease in a bit cost. According to PTL 3, the storage controller compresses WR data received from an outside of the storage apparatus, and stores the compressed data in a final storage device (for example, in the HDD or the SSD).

CITATION LIST

Patent Literature

[PTL 1] JP 2007-265265 A
[PTL 2] WO 2011/010344 pamphlet
[PTL 3] WO 2010/086900 pamphlet

SUMMARY OF INVENTION

Technical Problem

In the future, the SSD may have the above-described compression function with a view to the decrease in a bit cost of the SSD itself and the like. Hereinafter, the physical storage device having the compression function is called compression drive.

When the SSD itself has the compression function, the storage controller does not need to be aware of compressed data, and can perform read/write (hereinafter, R/W), similarly to the storage device without having the compression function. The compression drive, to which data is written from the storage controller, internally executes compression processing, and stores the data in the FM, thereby to reduce a use amount of the FM. However, the storage controller can write data of only the capacity of the compression drive to the compression drive. That is, the storage controller cannot further write data to a free capacity that is increased by the compression of the data in the compression drive, in a state where storage controller has written the data to the full capacity of the compression drive. This is because an area of the compression drive to which the storage controller can write the data is consumed by a noncompressed data size.

Further, in the technique of PTL 1, a gap is caused between a data WR amount stored in the storage apparatus and a data WR amount actually caused in the FM in the SSD, and an effect of the life leveling may not be able to sufficiently exerted. This is because the size of the data stored in the FM in the SSD may be changed due to compression while the data WR amount recognized by the storage apparatus as the statistical information is in a non-compressed state.

In the life leveling, the storage controller needs to select data having a large WR amount from the SSD having a short remaining life, and to migrate the data to the SSD having a long remaining life. At this time, if data A having a total WR amount of 100 GB in the statistical information, and data B having the total WR amount of 80 GB are stored in the SSD having a shorter remaining life, the data A having the larger total WR amount is selected as data of a migration target in the conventional technique. However, as for a data amount compressed in the SSD and actually stored in the FM, if the data amount of the data A is 50 GB (a compression ratio=50%) that is a good compression ratio, and the data amount of the data B is 64 GB (a compression ratio=80%) that is a not good compression ratio, such a case may be led to an increase in a load of the SSD having a shorter remaining life by WL. As a result, the storage controller has selected wrong data.

Meanwhile, in the technique of PTL 2, the storage controller acquire the actual WR amount to the FM from the SSD, the technique of PTL 2 can handle change of the data size due to compression. However, in the technique of PTL 2, the storage controller needs to recognize the internal information of the SSD in units of physical block in details. Therefore, the amount of the internal information of each SSD becomes large and the storage controller requires a memory having a large capacity. Further, a huge amount of internal information from each SSD is stored in the memory, and thus the storage controller needs to refer to the huge amount of internal information stored in the memory when leveling the number of times of deletion. Therefore, the load in the storage controller becomes large. Such a problem may similarly occur in a storage apparatus other than the SSD, the storage apparatus including a non-volatile semiconductor storage device having a restriction in the number of times of deletion.

Solution to Problem

A storage apparatus includes a semiconductor storage device, and a storage controller coupled to the semiconductor storage device and which stores data in a logical storage area provided by the semiconductor storage device. The semiconductor storage device includes one or more non-volatile semiconductor storage media, and a medium controller coupled to the semiconductor storage media. The medium controller compresses the data stored in the logical storage area and stores the compressed data in the semiconductor storage medium. The size of a logical address space of the logical storage area is larger than a total of the sizes of physical address spaces of the semiconductor storage media.

Advantageous Effects of Invention

A logical storage area having a larger capacity than physical capacities of semiconductor storage media is provided in a storage controller. Accordingly, the storage controller can store a larger capacity of data than the physical capacity of the semiconductor storage device, to the semiconductor storage device.

BRIEF DESCRIPTION OF DRAWINGS

FIG. 9 is a diagram illustrating a configuration example of a disk management table 13100.

FIG. 10 is a diagram illustrating a configuration example of an RG management table 13200.

FIG. 11 is a diagram illustrating a configuration example of a pool management table 13300.

FIG. 12 is a diagram illustrating a configuration example of an entry management table 13800.

FIG. 13 is a diagram illustrating a configuration example of an extent management table 13400.

FIG. 14 is a diagram illustrating a configuration example of a virtual volume management table 13500.

FIG. 15 is a diagram illustrating a configuration example of a statistical information management table 13600.

FIG. 16 is a diagram illustrating a configuration example of an FM WR amount expectation table 13700 according to the first example.

FIG. 18 is a diagram illustrating a configuration example of a logical-physical conversion table 23100.

FIG. 19 is a diagram illustrating a configuration example of a statistical information management table 23200 in an SSD.

FIG. 30 is a diagram illustrating a configuration example of a statistical information management table 13600 according to a second example.

FIG. 31 is a diagram illustrating a configuration example of an FM WR amount expectation table 13700 according to the second example.

FIG. 34 is a diagram illustrating a configuration example of a disk management table 13100 according to a third example.

FIG. 35 is a diagram illustrating a configuration example of an FM WR amount expectation table 13700 according to the third example.

DESCRIPTION OF EMBODIMENTS

Figure 1:
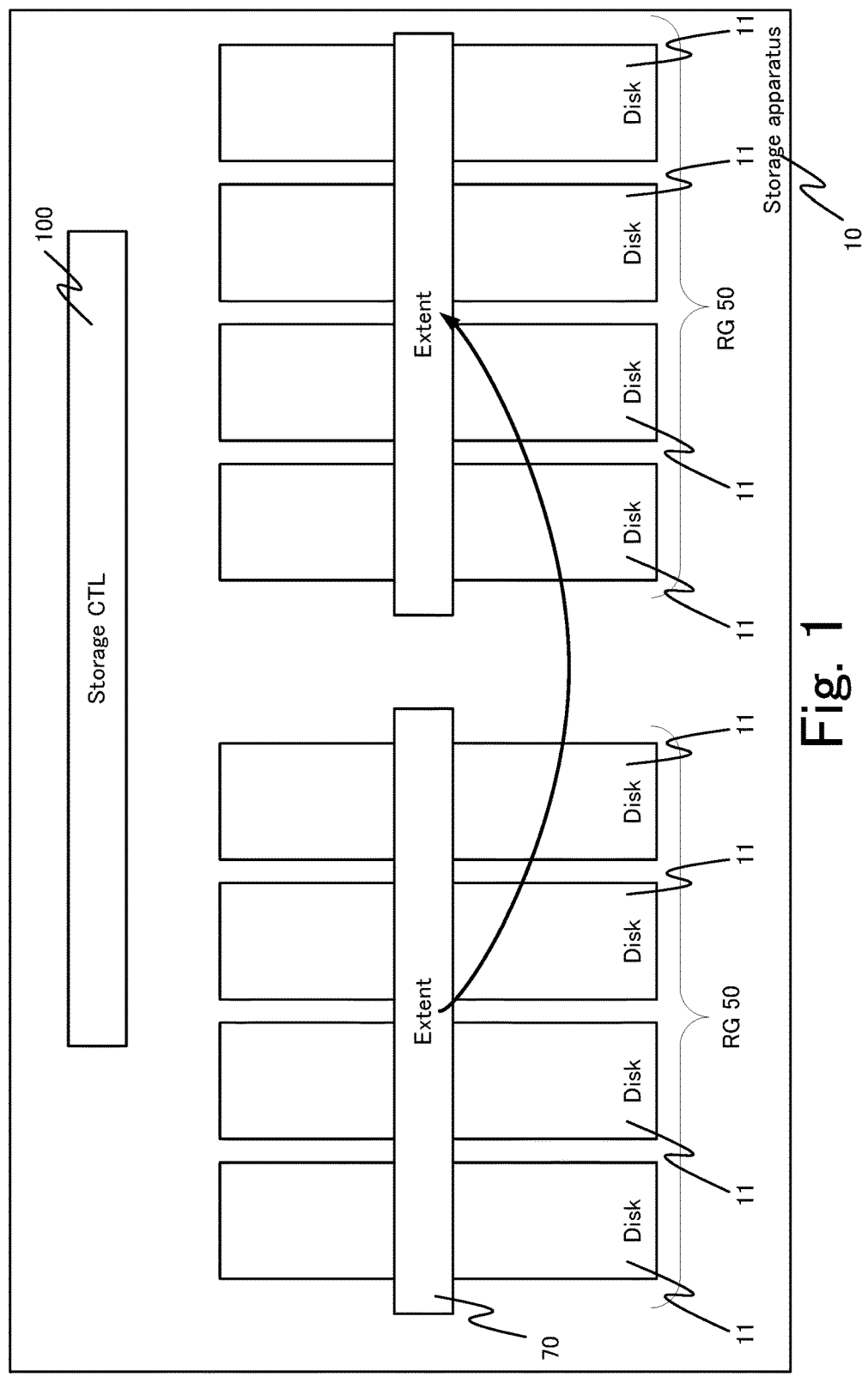
FIG. 1 is a diagram illustrating an outline of an embodiment.

Hereinafter, several examples will be described.

In the description below, various types of information may be described by an expression of "AAA table". However, the various types of information may be expressed by a data structure other than the table. The "AAA table" can be called "AAA information" in order not to show that the various types of information do not depend on the data structure.

Further, in the description below, a number is used as identification information of an element (for example, an extent). However, another type of identification information (for example, a name or an identifier) may be used.

Further, hereinafter, processing may be described using a "program" as the subject word. However, the program appropriately performs determined processing using a storage source (for example, a memory) and/or a communication interface apparatus (for example, a communication port), by being executed by a processor (for example, a central processing unit (CPU) included in a controller (a storage controller or an SSD controller). Therefore, the subject word of the processing may be the controller or the processor. Further, the controller may include a hardware circuit that performs a part or the whole of the processing. A computer program may be installed from a program source. The program source may be a program distribution server or a computer-readable storage medium.

Further, in the description below, a physical storage device may be described as "Disk" for convenience. However, this description does not necessarily mean that a storage medium included in the physical storage device is a disk-like storage medium. The physical storage device may be an SSD, for example.

Further, in the description below, a period or a time is used. However, the unit of the period or the time is not limited to the examples below. For example, the unit of the period or the time may be any one of, or a combination of two or more of year, month, day, hour, minute, and second.

Further, in the description below, a non-volatile semiconductor storage medium included in an SSD is a flash memory (FM). The flash memory is a type of flash memory, typically, a NAND-type flash memory, in which deletion is performed in units of block and R/W is performed in units of page. However, the flash memory may be another type of flash memory (for example, a NOR type), in place of the NAND type. Further, another type of non-volatile semiconductor storage medium such as a phase-change memory may be employed in place of the flash memory.

Further, the NAND-type flash memory is typically configured from a plurality of blocks (physical blocks). Each block is configured from a plurality of pages (physical pages). A logical page group (logical storage space) based on one or more SSDs (for example, a RAID group described below) may be provided. A physical page in which no data is written may be called "free page". In each logical page, recently written data is called "valid data", and data that becomes old data because the valid data is written can be called "invalid data". Further, a physical page in which the valid data is stored can be called "valid page", and a physical page in which the invalid data is stored can be called "invalid page".

First, an outline of an embodiment will be described.

FIG. 1 is a diagram illustrating an outline of an embodiment.

A storage apparatus 10 includes a storage controller 100 and a plurality of physical storage devices (disks) 11. Each physical storage device 11 servers as a base of two or more logical storage areas. The logical storage area may be an extent 70 described below, or may be all or a part of a logical volume (logical unit (LU)) provided in an upper apparatus (for example, a host computer) coupled to the storage apparatus 10. The plurality of physical storage devices 11 configures a RAID group (RG) 50. The storage controller 100 performs exhaustion avoidance processing and life leveling processing of the RAID group 50, and I/O performance leveling (rebalance) processing (input/output leveling processing), by migrating the extent 70 between the RAID groups 50, in addition to processing associated with an I/O request from the upper apparatus. Here, the RAID group is an example of a semiconductor storage unit. Note that the semiconductor storage unit may be one physical storage device 11.

First, the storage controller 100 acquires internal information related to each physical storage device from each physical storage device 11. For example, if the physical storage device 11 is an SSD (a storage device including a flash memory), the internal information is various types of capacity information (an entire capacity, an actual use amount, a total amount of data written in the flash memory after data compression, and the like) and information related to a life.

The storage controller 100 calculates an exhaustion risk of the RG, based on the internal information and statistical information related to an I/O amount, and determines necessity of execution of the exhaustion avoidance processing. The exhaustion risk is calculated by a WR I/O amount of the RG÷an RG actual free capacity, for example. In the exhaustion avoidance processing, first, the storage controller 100 identifies an RG 50 having a high exhaustion risk and which will not be able to receive WR due to occurrence of RG exhaustion in the near future, and an RG 50 having a low exhaustion risk and which is expected to have a long time to the RG exhaustion.

Next, the storage controller 100 determines a data amount (migration data amount) to be migrated from the RG 50 having a high exhaustion risk to the RG 50 having a low exhaustion risk. The migration data amount may be a migration amount that falls below a threshold (for example, 90% of an RG use amount) related to the exhaustion risk configured by the user, or may be a migration amount with which the exhaustion risk can be leveled between the RGs 50.

Next, the storage controller 100 migrates the data by the determined migration data amount. Here, a range of a storage area in migrating data is called "extent". The extent is an address range (logical area) that covers the plurality of physical storage devices 11 (for example, the SSDs), as illustrated by the reference sign 70. In a small unit such as a block unit or a page unit of the flash memory, a load for the data migration becomes large. In contrast, the load for the data migration of the storage controller 100 can be suppressed by performing the data migration in a unit larger than the block or the page, and in a unit of the extent that covers a plurality of RGs 50.

The storage controller 100 calculates a remaining life of the RG 50, and determines necessity of execution of the life leveling processing, after execution of the exhaustion avoidance processing, or when determining that the exhaustion avoidance processing is unnecessary. As the remaining life of the RG 50, a minimum value of remaining life information of the physical storage devices 11 (here, the SSDs) that configure the RG 50 is employed as the remaining life. Further, as the remaining life of the RG 50, an average value of the remaining lives of the physical storage devices 11 (SSDs) that configure the RG 50 may be employed as the remaining life of the RG 50. In the life leveling processing, first, the storage controller 100 identifies an RG configured from SSDs having a short remaining life and which will ends the life in the near future and becomes unavailable, and an RG configured from SSDs having a long remaining life.

Next, the storage controller 100 determines an extent having a high WR load in the RG having a short remaining life, and an extent having a low WR extent in the RG having a long remaining life, and exchanges data of the extends.

To be specific, to determine the WR load, the storage controller 100 measures a WR data amount for each extent. For example, if the WR data amount to the SSD is large, rewrite of a block frequently occurs, and the number of times of deletion of the block is increased with the rewrite. If the number of times of deletion of the block is increased, the number of times of deletion of the block reaches limitations (an upper limit value), and read (hereinafter, RD) from the block is available but WR becomes unavailable. Then, the SSD in which such a block is increased becomes unavailable. Therefore, the storage controller 100 finds an extent having a large WR data amount, and migrate the data included in the extent from the RG of the SSD having a short life to the RG of the SSD having a long life.

Accordingly, the number of times of deletion can be leveled between the SSD without increasing the load of the storage controller 100. Further, the life leveling can be realized with a minimum migration data amount by exchanging the data between the extent having a large WR I/O amount in the RG of the SSD having a short life, and the extent having a small WR I/O amount in the RG of the SSD having a long life.

The storage controller 100 calculates the I/O amount of the RG 50, and determines necessity of execution of the I/O performance rebalance processing, after execution of the life leveling processing, or when determining that the life leveling processing is unnecessary. In the I/O performance rebalance processing, first, the storage controller 100 identifies an RG having a large I/O amount and a high I/O load, and an RG having a small I/O amount and a low I/O load.

Next, the storage controller 100 determines an extent having a high I/O load in the RG having a high I/O load, and an extent having a low I/O load in the RG having a low I/O load, and exchanges data of the extents.

Hereinafter, specific examples of the present embodiment will be described in detail.

FIRST EXAMPLE

Figure 2:
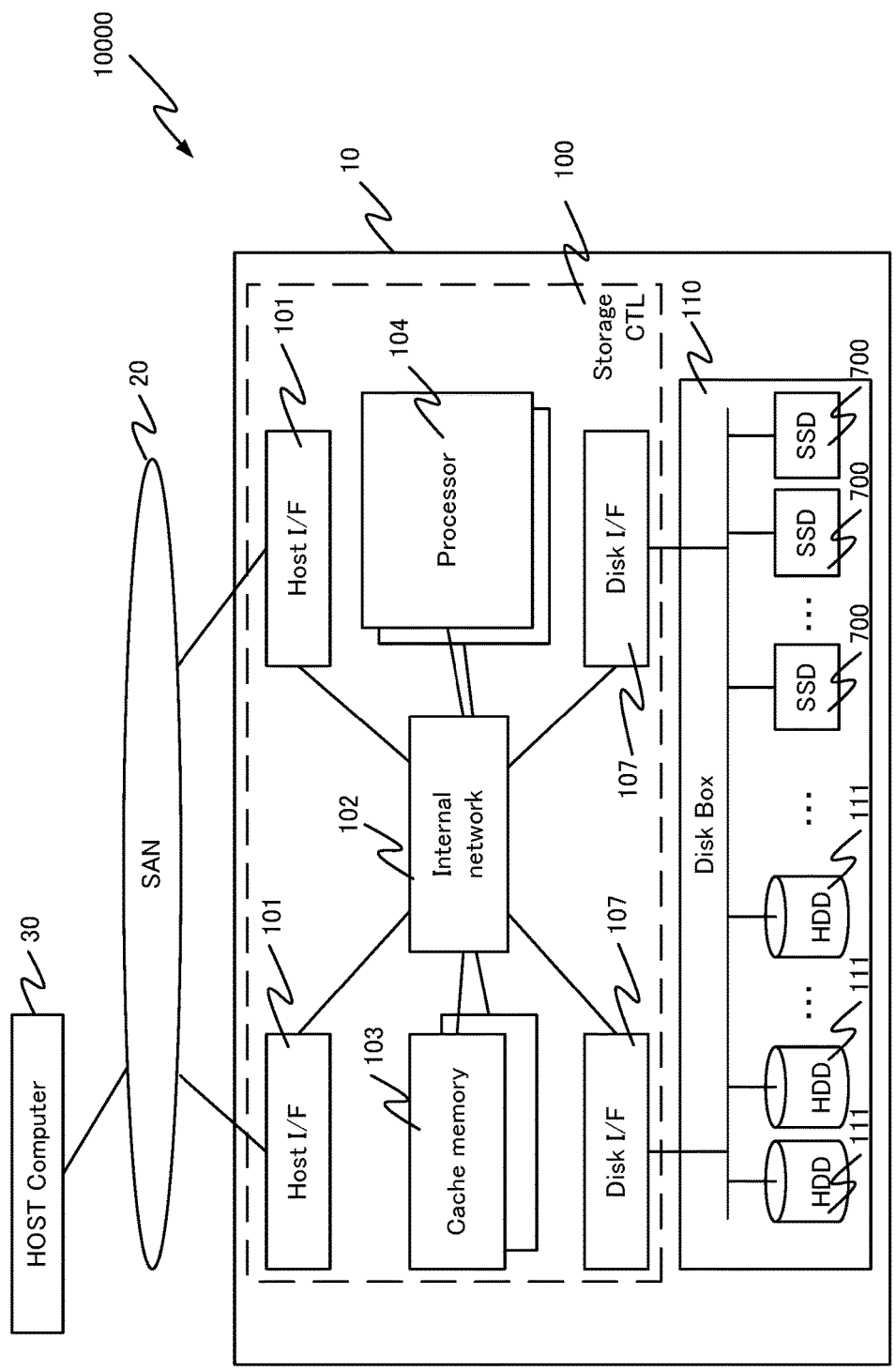
FIG. 2 is a diagram illustrating a configuration example of a storage system 10000 including a storage apparatus 10 according to a first example.

FIG. 2 is a diagram illustrating a configuration example of a storage system 10000 including a storage apparatus 10 according to a first example.

The storage system 10000 includes the storage apparatus 10 and a host computer 30. The host computer 30 is an example of an upper apparatus that uses the storage apparatus 10. The host computer 30 is an application server, for example. The host computer 30 and the storage apparatus 10 are communicatively coupled to each other through a storage area network (SAN) 20, for example. As the SAN 20, a fiber channel, a small computer system interface (SCSI), an internet small computer system interface (iSCSI), a universal serial bus (USB), an IEEE1394 bus, a serial attached SCSI (SAS), or the like can be used. Further, another type of communication network (for example, a local area network (LAN)) may be employed in place of the SAN 20. Note that, in the example of FIG. 2, the storage system 10000 includes one host computer 30 and one storage apparatus 10. However, the storage system 10000 may include at least one of a plurality of the host computers 30 and a plurality of the storage apparatuses 10.

The host computer 30 issues a control command or the like to the storage apparatus 10 to maintain and manage the storage apparatus 10 by executing control software (not illustrated) that issues the control command or the like to the storage apparatus 10. Processing based on the control command is executed in the storage apparatus 10, so that various types of work can be performed, such as change of a RAID level of an RG included in the storage apparatus 10, adjustment of various start thresholds of exhaustion avoidance processing, life leveling processing, and I/O performance rebalance processing, and ON/OFF configuration of a compression function in units of pool or RG. Note that the RG 50 is a physical storage device group that is configured from a plurality of SSDs (or HDDs), and stores data according to a predetermined RAID level. As a computer that issues the control command to the storage apparatus 10, a computer different from the host computer 30 may be used.

The storage apparatus 10 includes a storage controller (storage CTL) 100 and a disk box 110 coupled to the storage controller 100.

The storage controller 100 controls an operation of the storage apparatus 10. The storage controller 100 includes communication interface devices, a memory, and a control device coupled to the communication interface devices and the memory. As the communication interface devices, there are a host I/F 101 that is a front-end communication interface device and a disk I/F 107 that is a back-end communication interface device. As the memory, there is a cache memory 103. As the control device, there is a processor (for example, a central processing unit (CPU)) 104. The host I/F 101, the cache memory 103, the processor 104, and the disk I/F 107 are coupled to an internal network 102 with a dedicated connection bus such as a peripheral component interconnect (PCI), for example, and can perform communication with each other through the internal network 102.

The cache memory 103 is DRAM like a double data rate 3 (DDR3). The host I/F 101 is an interface for connecting the storage apparatus 10 with the SAN 20. The internal network 102 is a network for connecting the devices existing in the storage apparatus 10. The internal network 102 includes a switch. An application specific integrated circuit (ASIC) having a switch function and an assist function such as DMA transfer and RAID calculation may be used in place of the internal network 102. The processor 104 controls the entire storage apparatus 10. A plurality of the processors 104 may exist. In this case, the plurality of processors 104 may control the storage apparatus 10 in cooperation with each other or by sharing. The cache memory 103 includes an area in which a computer program necessary for the processor 104 to control the storage apparatus 10 and data are stored. The disk I/F 107 is an interface for connecting the storage controller 100 and the disk box 110. The disk box 110 includes a plurality of different types of the disks 11 (for example, non-volatile physical storage devices such as HDDs 111 and SSDs 700). In the disk box 110, an RG is configured from the same type of the plurality of disks. Each RG provides a logical volume as a storage space of user data. Note that, in FIG. 2, as the disks 11 that configure the disk box 110, the HDDs 111 and the SSDs 700 are used. However, only the SSDs 700 may be used.

Figure 3:
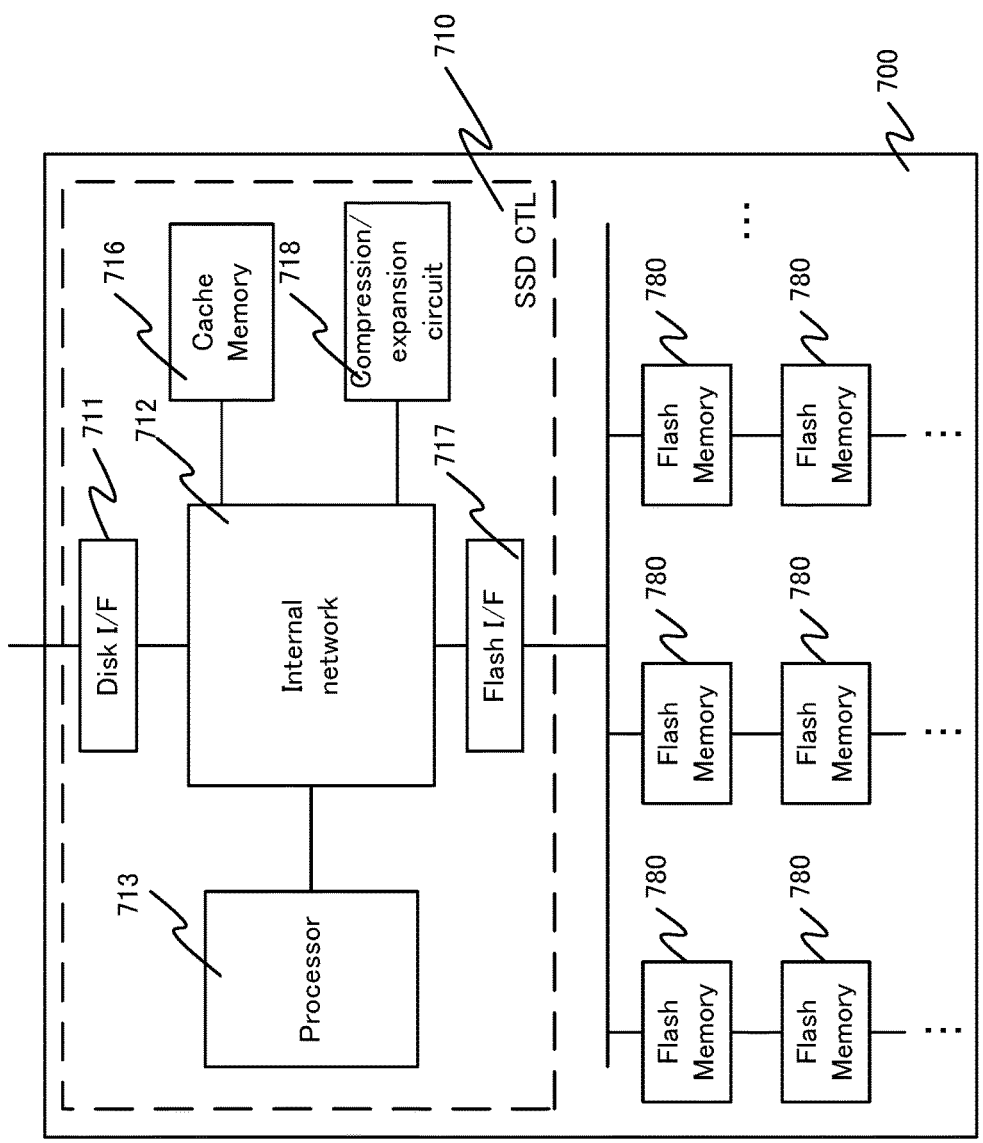
FIG. 3 is a diagram illustrating a configuration example of an SSD 700.

FIG. 3 is a diagram illustrating a configuration example of the SSD 700.

The SSD 700 includes a plurality of flash memories 780 and an SSD controller 710 coupled to the plurality of flash memories 780. The SSD controller 710 controls an operation of the SSD 700. The SSD controller 710 includes communication interface devices, a memory, a control device coupled to the communication interface device and the memory, and a hardware device that executes compression/expansion of data. As the communication interface devices, there are a disk I/F 711 that is a front-end communication interface device and a flash I/F 717 that is a back-end communication interface device. As the memory, there is a cache memory 716. As the control device, there is a processor 713. As the hardware device that executes compression/expansion of data, there is a compression/expansion circuit 718. Note that a function to execute compression/expansion of data may be realized in a software manner by execution of a dedicated program by the processor 713. The disk I/F 711, the processor 713, the cache memory 716, the flash I/F 717, and the compression/expansion circuit 718 are coupled to each other through an internal network 712.

The disk I/F 711 is coupled to the disk I/F 107 of the storage controller 100 with a dedicated connection bus. The internal network 712 is a network for connecting the devices. The internal network 712 may include a switch. Further, the internal network 712 may be substituted by an ASIC having a switch function. The processor 713 controls the entire SSD 700. The cache memory 716 includes an area in which a computer necessary for the processor 713 to control the SSD 700 and data are stored. The Flash I/F 717 is an interface for connecting the SSD controller 710 and the flash memories 780.

In the present example, the SSD 700 is a semiconductor storage device that includes the plurality of flash memories 780 and the controller 710 that controls the plurality of flash memories 780, and an external shape and the like are not limited to the form factor. Further, non-volatile semiconductor memory such as NOR or NAND may be used for the flash memory 780. Further, various semiconductor memories such as magnetoresistive random access memory (MRAM), resistance random access memory (ReRAM) that is a resistance-change type memory, and ferroelectric random access memory (FeRAM) that is a ferroelectric memory may be used in place of the flash memories 780.

Figure 4:
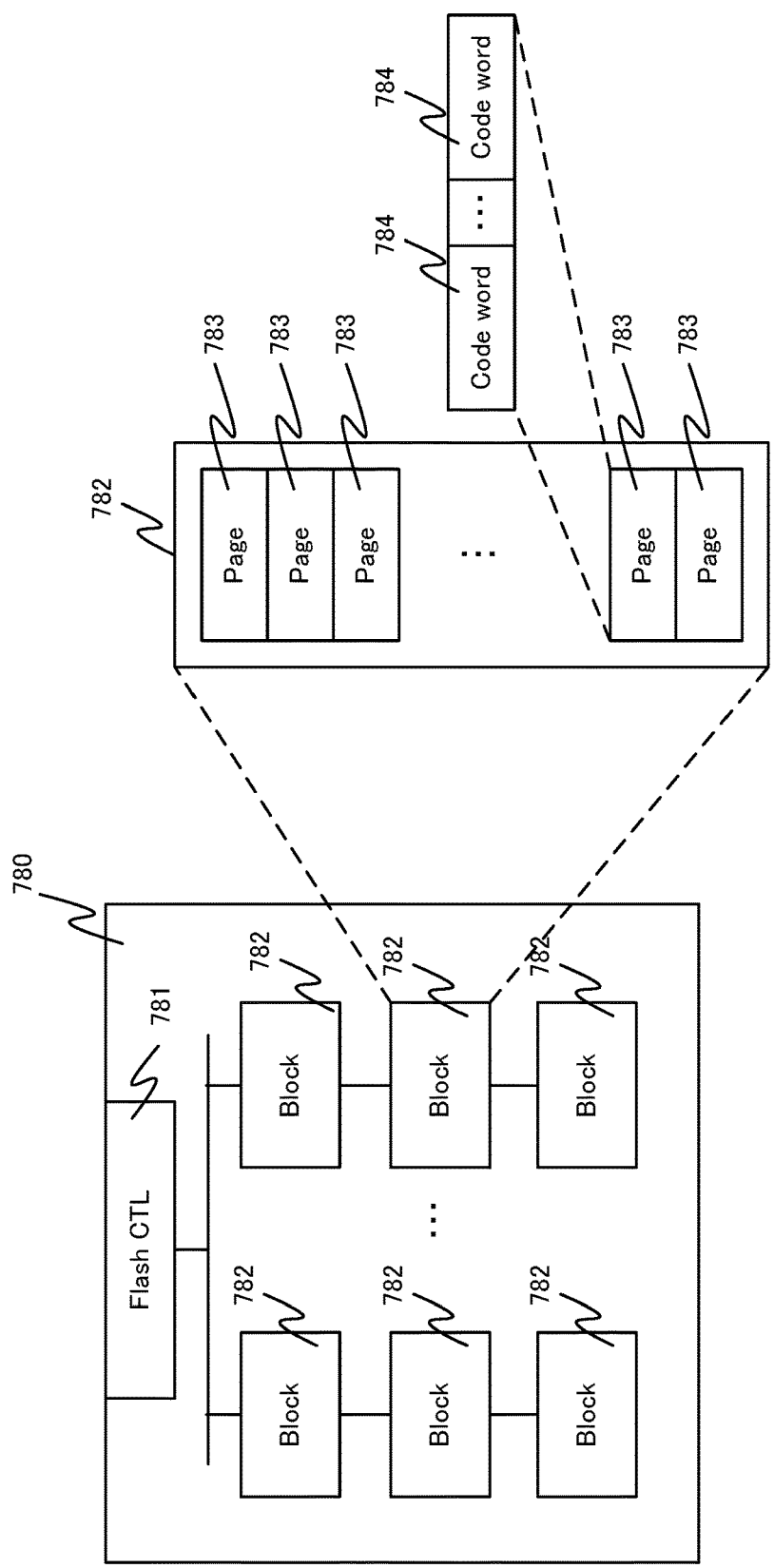
FIG. 4 is a diagram illustrating a configuration example of a flash memory 780.

FIG. 4 is a diagram illustrating a configuration example of the flash memory 780.

The flash memory 780 includes a plurality of blocks 782 and a flash memory controller (hereinafter, flash controller) 781 coupled to the plurality of blocks 782. The flash controller 781 controls the flash memory 780. Each block 782 is configured from a plurality of pages 783. RD of data from the flash memory 780, and WR of data to the flash memory 780 are executed in units of page. Data deletion is executed in units of block. The page 783 is configured from a plurality of code words 784. In the code word 784, data stored by the host computer 30 and an ECC that is an error correction code for protecting the data are stored.

The flash memory 780 is a NAND-type flash memory, for example. In the NAND-type flash memory, data cannot be overwritten. Therefore, in the flash memory 780, when new data is written in the page 783 in which data is already written, the data is erased, and the new data is written in the data-erased page 783 from which the data has been erased.

The SSD controller 710 performs leveling processing of the number of times of deletion for the plurality of blocks 782 in the SSD 700. The SSD controller 710 levels the number of times of deletion of the blocks 782 in the SSD 700 by storing data having a small update frequency to a block 782 having a large number of times of deletion, and storing data having a large update frequency to a block 782 having a small number of times of deletion. Note that the SSD controller 710 may level the number of times of deletion by selecting a free block 782 having a small number of times of deletion and storing data in the selected block 782, in WR. At this time, the SSD controller 710 may divide the plurality of blocks 782 into a plurality of groups according to the number of times of deletion, and select the block 782 to which the data is stored from a group having a small number of times of deletion. As described above, the number of times of deletion of the plurality of blocks 782 in the SSD 700 is leveled, so that the life prolongation of the SSD 700 is achieved.

Figure 5:
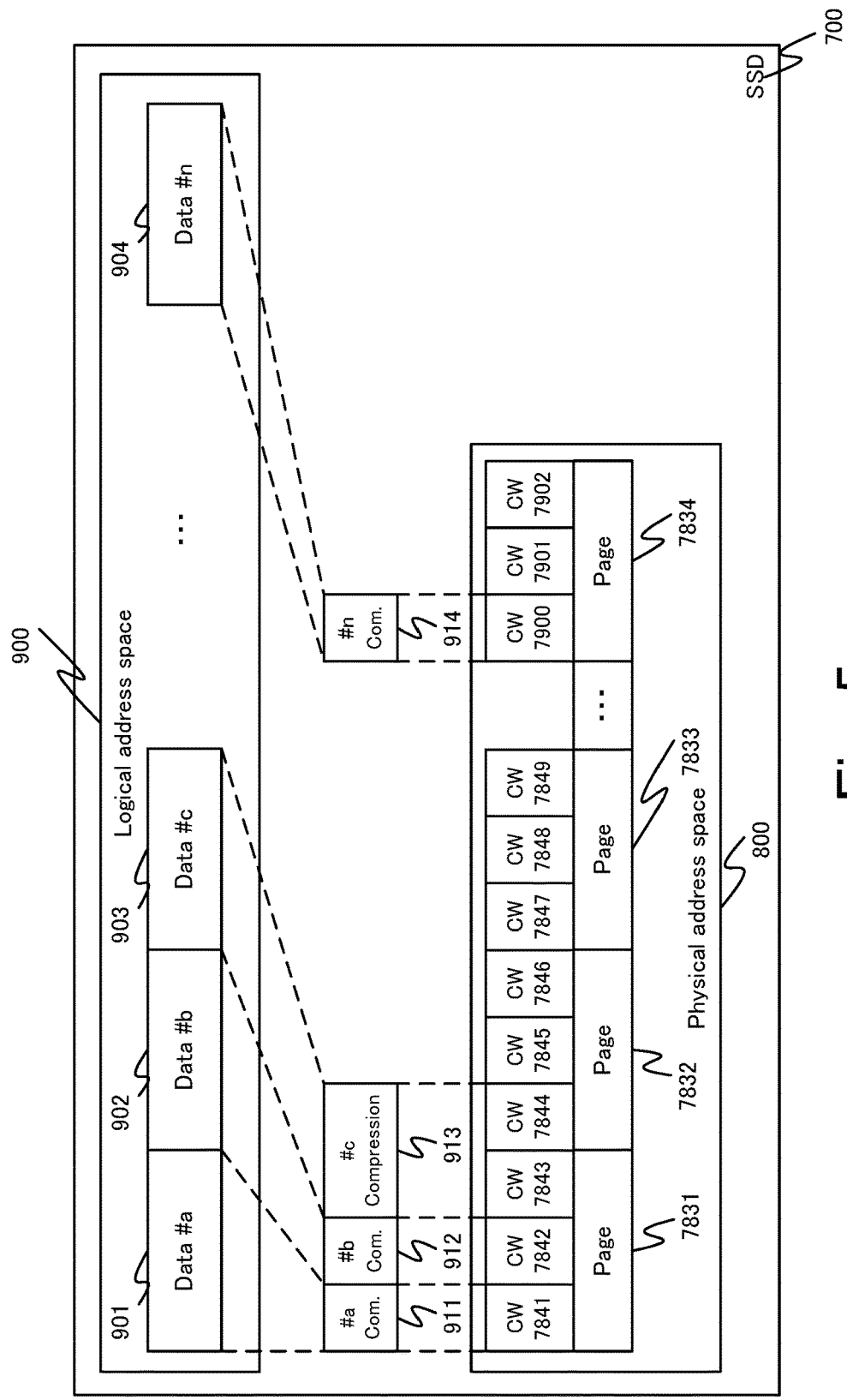
FIG. 5 is a diagram illustrating a configuration example of an address space of the SSD 700.

FIG. 5 is a diagram illustrating a configuration example of an address space of the SSD.

In the SSD 700, a physical address space 800 and a logical address space 900 larger than the physical address space 800 exist. The physical address space 800 is an address space of a physical storage area in which actual data is stored. Meanwhile, the logical address space 900 is a unique address space provided by the SSD 700 to the storage controller 100.

The SSD controller 710 divides the logical address space 900 into a plurality of areas (hereinafter, logical pages) 901, 902, 903, 904, and the like having the same size as the physical page size. Here, in the present example, the SSD 700 has a data compression function, and thus data in the logical page 901 is converted (compressed) into compressed data 911, data in the logical page 902 is converted into compressed data 912, data in the logical page 903 is converted into compressed data 913, and data in the logical page 904 is converted into compressed data 914, respectively. A compression ratio is changed according to a data pattern and the like. Therefore, the size of each compressed data that is a converted logical page is not necessarily constant, and becomes an arbitrary size. Each compressed data is stored in the physical page in units of code word (CW). In FIG. 5, the compressed data 911 is stored in a CW 7841, the compressed data 912 is stored in a CW 7842, the compressed data 913 is stored in a CW 7843 and a CW 7844, and the compressed data 914 is stored in CW 7900.

As described above, in the SSD 700 having a data compression function, the logical page and the physical page are not in one-to-one relationship, and the physical page is dynamically allocated to the compressed data after compression that is to be actually stored in the FM 780. Further, in the SSD 700, the logical address space 900 is made larger than the physical address space 800, so that the storage controller 100 can write data of more than the physical storage capacity mounted in the SSD 700.

Here, consider how much size of the logical address space 900 is employed. In the present example, the size of the logical address space 900 is determined, supposing that all data to be written are compressed at a most favorable compression ratio (for example, 1/8), which is available in the compression/expansion circuit 718. In this case, the SSD 700 provides the logical address space 900 having a logical capacity that is eight times the physical capacity mounted in the SSD 700 itself, to the storage controller 100. For example, if the SSD 700 in which 1 TB of capacity is physically mounted has the most favorable compression ratio of 1/8, the SSD 700 provides 8 TB of logical capacity to the storage controller 100. Accordingly, the storage controller 100 can store data equal to or larger than the actual physical capacity of the SSD 700, by simply writing data, similarly to an HDD or an SSD without having the compression function. In this case, the compression ratio of the written data is changed according to a data pattern and the like, and thus in an actual case, the compression ratio may become worse than 1/8, and the storage controller 100 cannot always store 8 TB of data to the SSD 700. In this way, a state in which the physical capacity becomes full before the logical capacity becomes full, of the SSD 700, is called exhaustion state.

The storage controller 100 cannot write data at all to the SSD 700 in the exhaustion state. A WR command to the SSD 700 in the exhaustion state becomes an error response. This is because, as described above, the NAND-type FM 780 cannot be simply overwritten with data, and when new data is write to a page in which data is stored, it is necessary that the data is erased, and the new data is written to the data-erased page from which the data has been erased, and the SSD 700 in the exhaustion state cannot prepare the data-erased page.

On the other hand, there is no restriction of WR for the SSD 700 in a non-exhaustion state, and WR can be performed in the entire logical address space 900.

Therefore, the storage controller 100 executes exhaustion avoidance processing described below not to allow the SSD 700 to be in the exhaustion state, and keeps the SSD 700 in the non-exhaustion state on a constant basis.

The SSD controller 710 can realize WL and the like in the SSD 700 by dynamically changing mapping of the address range (logical storage area) that configures the logical address space 900 and the address range (physical storage area) that configures the physical address space 800. Note that the processor 713 manages correspondence between the logical address space 900 and the physical address space 800, using a logical-physical conversion table 23100 described below. In the present, the storage controller 100 does not directly manage the logical-physical conversion table in the SSD 700. Therefore, the storage controller 100 cannot recognize the correspondence between the logical address space 900 and the physical address space 800 unless the processor 713 of the SSD 700 notifies the storage controller 100 with SSD internal information and the like.

Next, a capacity virtualization technology will be described.

The capacity virtualization technology (for example, thin provisioning) is a technology that provides a virtual capacity larger than the physical capacity included in the storage apparatus 10 to the side of the host computer 30. The host computer 30 accesses a virtual logical volume (virtual volume). In the capacity virtualization technology, when the storage apparatus 10 receives a WR request, a physical storage area is allocated to a virtual storage area (virtual extent) of a WR destination of data of the WR request. In the present example, the unit of the physical storage area allocated in the capacity virtualization technology is an extent unit. Further, the size of the extent may cover a wide range from several MB to several GB.

Figure 6:
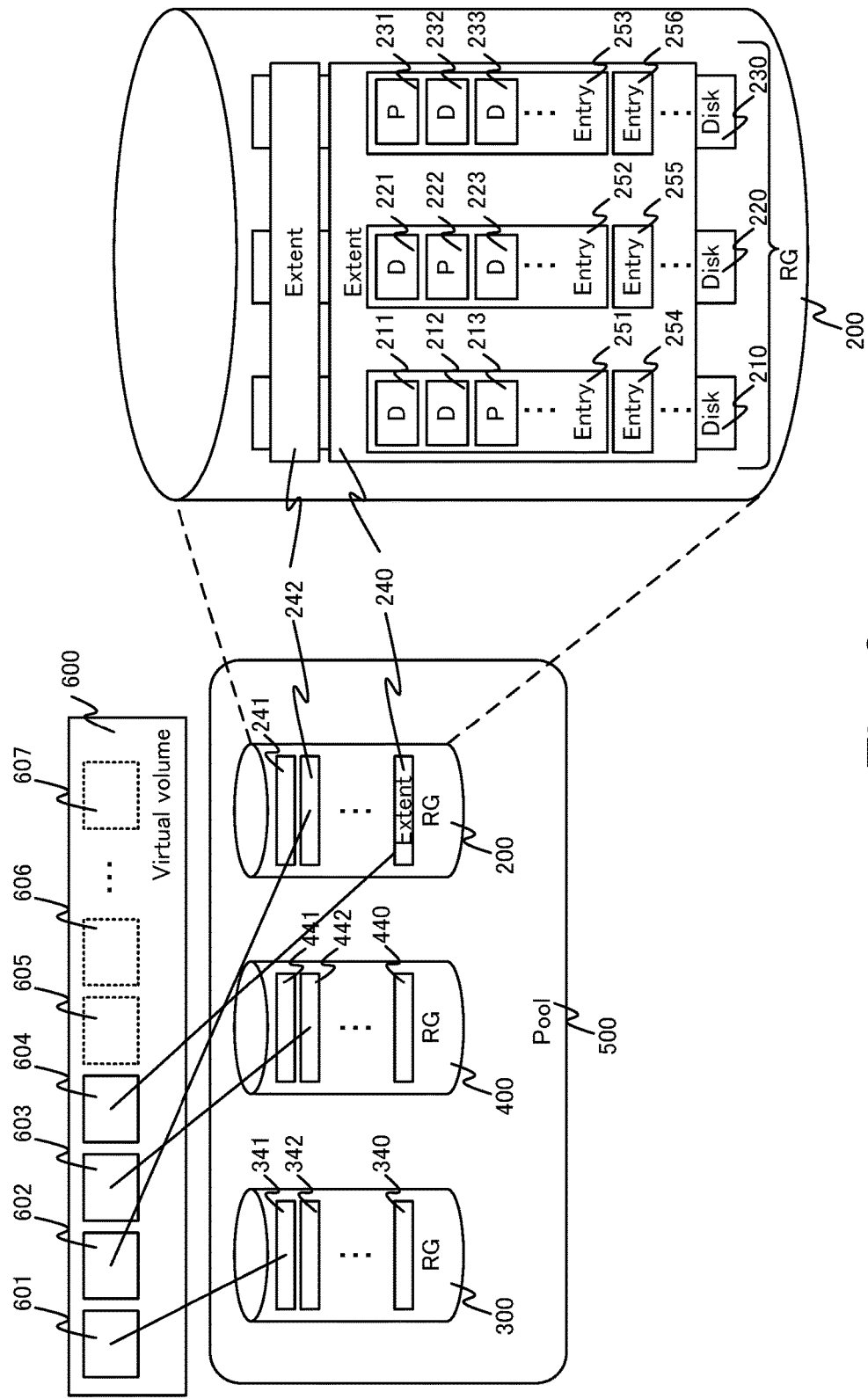
FIG. 6 is an explanatory diagram of an outline of a capacity virtualization technology.

FIG. 6 is an explanatory diagram of an outline of the capacity virtualization technology.

RGs (200, 300, and 400) are configured from the same type of the disk 11 (for example, the SSD 700). A pool 500 is configured from one or more RGs.

Extents (240, 241, 241, 340, 440, and the like) are storage area (partial storage area) obtained by dividing the pool 500, that is, a part of the pool 500. In FIG. 6, the pool 500 is configured from three RGs of the RG 200, RG 300, and RG 400. Hereinafter, description will be given using the RG 200 as an example.

The RG 200 is configured from a disk 210, a disk 220, and a disk 230. The RG 200 builds a RAID 5, and data (D in FIG. 6) and parity (P in FIG. 6) are stored in the disks (210 to 230).

The storage area based on the RG 200 is divided into the plurality of extents (240, 241, and 242). The storage area based on the RG 200 corresponds to the logical address space 900 provided by the plurality of SSDs 700.

The extent is a storage area having a larger size than the block 782 of the SSD 700. The size of the extent is N times (N is an integer of 2 or more) the block. The extent is configured from entries (for example, entries 251, 252, 253, 254, 255, and 256) that are the logical address space existing in each disk. In the entry, a plurality of data and parity is stored. In FIG. 6, for example, data 211, data 212, parity 213, and the like are stored in the entry 251, data 221, data 223, parity 222, and the like are stored in the entry 252, data 232, data 233, parity 231, and the like are stored in the entry 253. In the entries 254, 255, and 256, a plurality of data and parity is similarly stored. Further, the entries 251 and 254 are built in the disk 210, the entries 252 and 255 are built in the disk 220, and the entries 253 and 256 are built in the disk 230, respectively.

In FIG. 6, the extents 240, 241, and 242 are created from the storage area of the RG 200. The extents 340, 341, and 342 are created from the storage area of the RG 300. The extents 440, 441, and 442 are created from the storage area of the RG 400.

A virtual volume 600 is a virtual logical volume for the host computer 30 storing user data. A capacity defined as a capacity of the virtual volume 600 can be a storage capacity larger than a total of capacities of the physical storage devices included in the storage apparatus 10. Note that the virtual volume 600 is configured from an arbitrary number of virtual extents (601 to 607, and the like). A storage area of the virtual volume 600 is managed with virtual addresses (logical addresses that configure the virtual volume), and the virtual extent is configured from a storage area of a virtual address divided in a predetermined area. In FIG. 6, one virtual extent is associated with one extent. However, one virtual extent may be associated with a plurality of extents.

The virtual extents 601 to 604 illustrated by the solid lines in FIG. 6 are virtual extents to which the extents are allocated from the RGs 200, 300, and 400. That is, the extent 341 is allocated to the virtual extent 601, the extent 242 is allocated to the virtual extent 602, the extent 442 is allocated to the virtual extent 603, and the extent 240 is allocated to the virtual extent 604, respectively. Further, in FIG. 6, the virtual extents 605 to 607 illustrated by the broken lines are not the virtual extents to which addresses belong, as the WR destinations of data. Therefore, the extents have not yet been allocated to these virtual extents 605 to 607.

Figure 7:
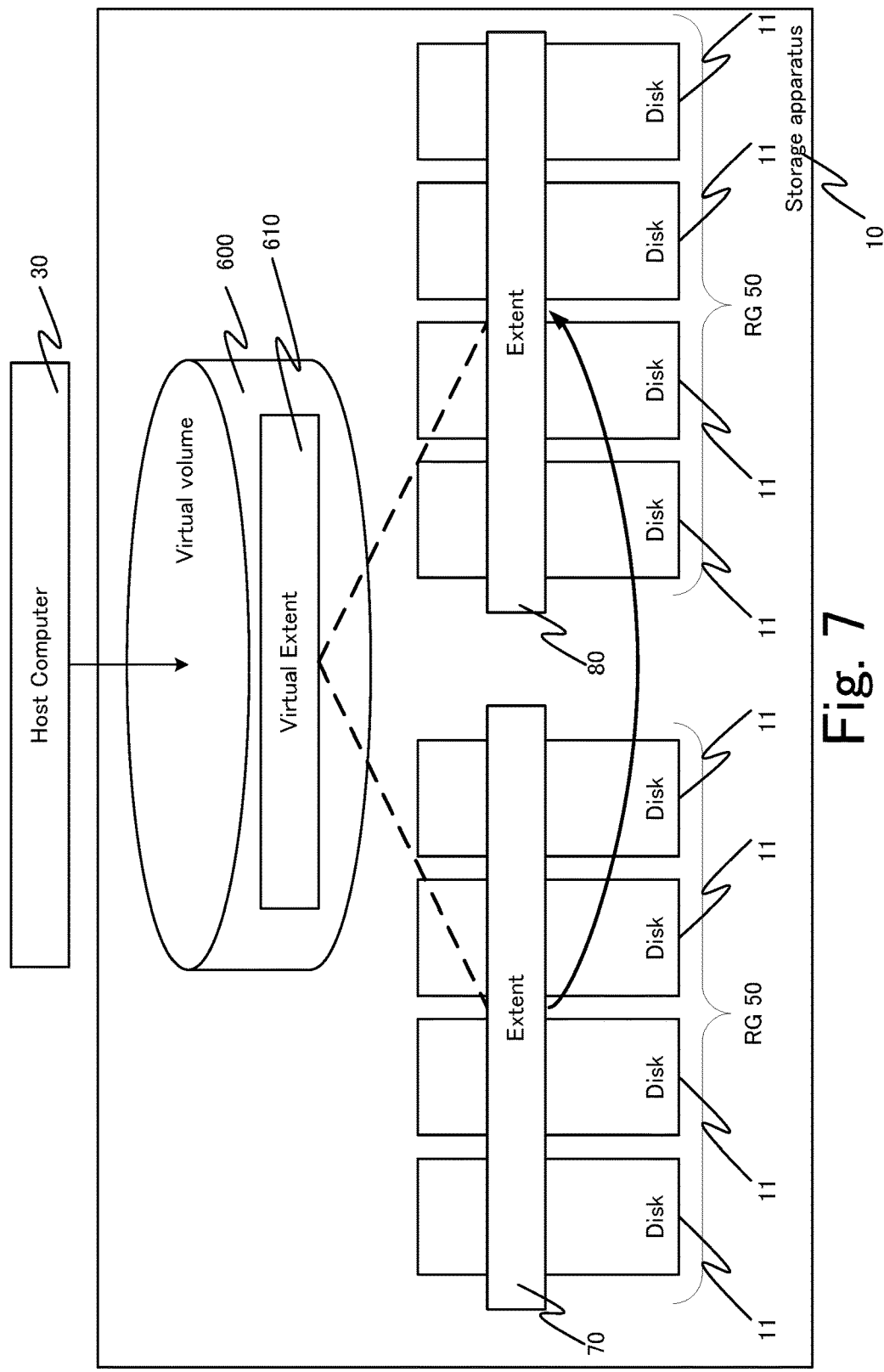
FIG. 7 is a diagram for describing an outline of a data access of a case where data is migrated between RGs by data migration processing.

FIG. 7 is a diagram for describing an outline of an access of a case where data is migrated between the RGs by the data migration processing. The data migration processing is executed in asynchronous processing for SSD (see FIG. 23).

When data is migrated between the RGs, the host computer 30 needs to change an access destination to the data to an RG of a migration destination. However, when the address is changed using the virtual volume 600, the host computer 30 can access the data in the migration destination without changing the access destination. That is, the storage controller 100 changes association to a virtual address of a virtual extent 610 from the logical address of the extent 70 of a migration source to the logical address of an extent 80 of the migration destination. Therefore, even if the asynchronous processing for SSD is performed, the host computer 30 does not need to change the address of the access destination, by accessing the virtual volume 600. Note that, in the present example, the virtual volume is used for the address conversion. However, a method is not limited to the example, and the address conversion may be performed without using the virtual volume.

Figure 8:
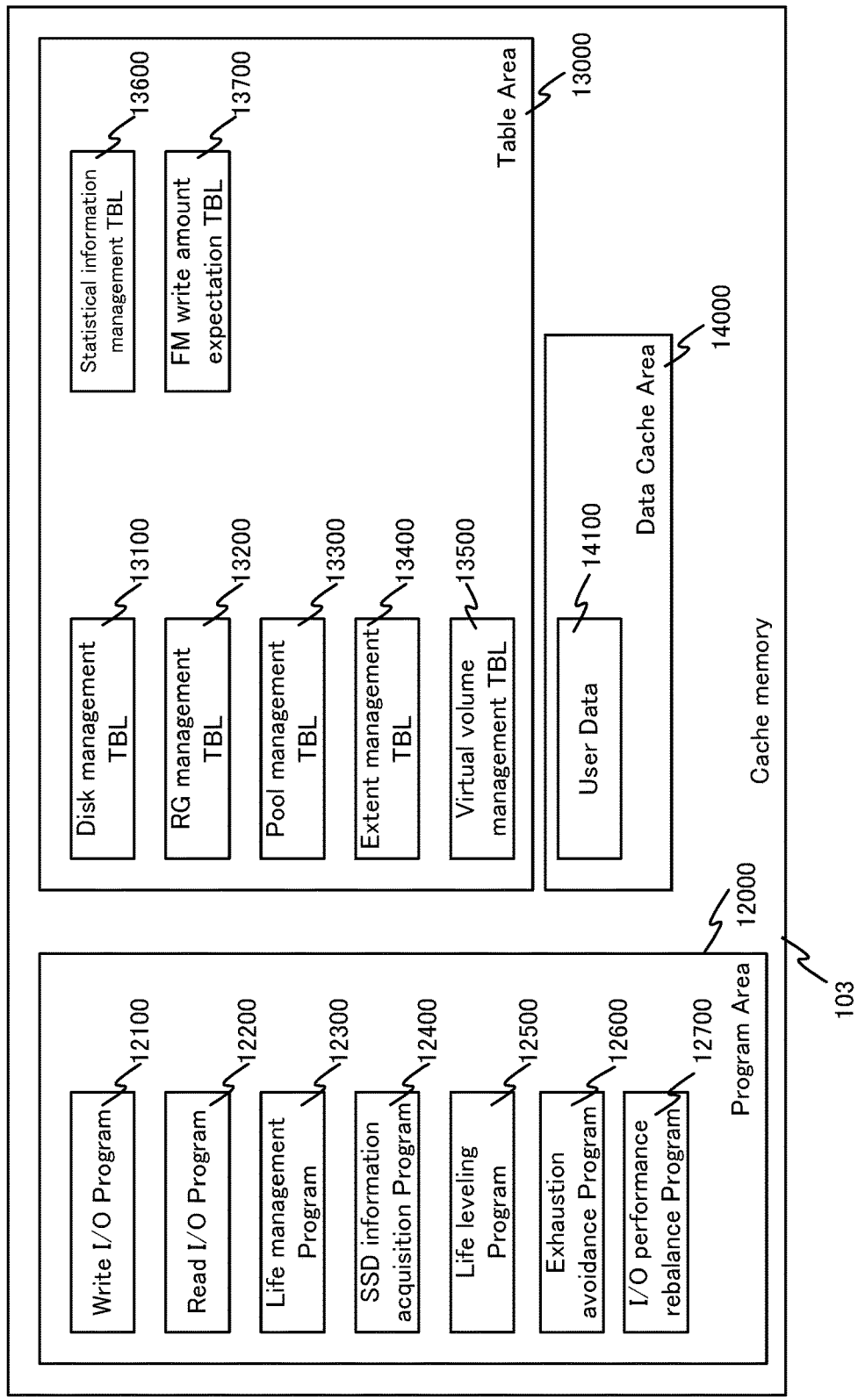
FIG. 8 is a diagram illustrating a configuration example of a cache memory 103.

FIG. 8 is a diagram illustrating a configuration example of the cache memory 103.

The cache memory 103 of the storage controller 100 includes a program area 12000, a table area 13000, and a data cache area 14000. The program area 12000 and the table area 13000 are areas in which a program for controlling the storage apparatus 10 and various tables are stored. The data cache area 14000 is an area used for temporarily storing user data.

In the program area 12000, a write I/O program 12100, a read I/O program 12200, a life management program 12300, an SSD information acquisition program 12400, a life leveling program 12500, an exhaustion avoidance program 12600, and an I/O performance rebalance program 12700 are stored.

The write I/O program 12100 is a program for processing a WR request from the host computer 30. The read I/O program 12200 is a program for processing an RD request from the host computer 30. The life management program 12300 is a program for the processor 104 managing lives of various disks such as the SSDs 700. The SSD information acquisition program 12400 is a program for acquiring internal information of the SSDs 700. The life leveling program 12500 is a program for converting the lives of the SSDs 700 in an RG unit, and executing the life leveling of the RGs. The exhaustion avoidance program 12600 is a program for calculating the exhaustion risks of the RGs from the capacity information of the SSD 700, and executing the exhaustion avoidance of the RG having a high exhaustion possibility. The I/O performance rebalance program 12700 is a program for detecting a specific RG that is a bottleneck of performance, from the I/O statistical information of the RGs, and executing performance leveling.

The table area 13000 includes a disk management table (a table may be described as TBL) 13100, an RG management table 13200, a pool management table 13300, an extent management table 13400, a virtual volume management table 13500, a statistical information management table 13600, and an FM write amount expectation table 13700.

The disk management TBL 13100 is a table in which information related to the disks stored in the disk box 110 is stored. The RG management TBL 13200 is a table in which information related to the RAID groups is stored. The pool management TBL 13300 is a table in which information of the pool is stored. The extent management TBL 13400 is a table in which information related to the extents is stored. The virtual volume management TBL 13500 is a table in which information related to the virtual volume is stored. The statistical information management TBL 13600 is a table in which various types of information related to I/O performance of the storage apparatus 10 is stored. The FM write amount expectation TBL 13700 is a table used when the processor 104 expects a data write amount in the SSD to determine the migration target data in executing the life leveling processing.

In the data cache area 14000, user data 14100 according to the WR request and the RD request is temporarily stored. The user data 14100 is data used by the host computer 30.

FIG. 9 is a diagram illustrating a configuration example of the disk management table 13100.

The disk management TBL 13100 mainly manages information (exhaustion-related information and remaining life information) for performing exhaustion management and life management of each disk managed by the storage controller 100 management. The disk management TBL 13100 includes, for each disk, a disk #13101, a disk type 13102, an information updated date 13103, a remaining warranty period 13104, an expected remaining life 13105, a compression configuration 13106, an FM read total amount 13107, an FM write total amount 13108, an average compression ratio 13109, a remaining number of times of deletion 13110, an FM use amount 13111, a physical capacity 13112, and a logical capacity 13113.

The disk #13101 is an identifier of the disk and is a unique number. The disk type 13102 indicates a type of the disk. As the type of the disk, there are an SSD (SLC), an SSD (MLC), an HDD, and the like. Here, as the SSD, three types including a single level cell (SLC) type, a multi-level cell (MLC) type, and a triplet level cell (TLC) type exist according to the type of the NAND flash memory to be used. The SLC is a high-speed, long-life, and low-capacity flash memory, and can erase blocks in the order from hundreds of thousands of times to tens of thousands of times. The MLC is a low-speed, short-life, and large-capacity flash memory, and can erase blocks in the order from tens of thousands of times to thousands of times. The TLC is a lower-speed and shorter-life flash memory than the MLC, but is a larger-capacity flash memory and can erase blocks in the order from thousands of times to hundreds of times.

The information updated date 13103 indicates a recent date when the information related to the disk is updated (for example, a date when the life information or the like is updated). The remaining warranty period 13104 indicates how much a warranty period of the disk determined by a vendor remains. In the example of FIG. 9, the remaining warranty period 13104 is indicated as the number of days. Here, the warranty period of a disk is a period in which the disk is normally operated is guaranteed (for example, five years). The flash memory is deteriorated due to an increase in the number of times of deletion by write of data, and when reaching the end of the life, R/W of data becomes unavailable, and data retention property becomes significantly deteriorated. Therefore, as a period in which the disk is normally usable, a threshold is configured in advance based on the number of times of deletion, the total WR amount, and the like. When a use period of the disk exceeds the warranty period, the disk is replaced.

The expected remaining life 13105 indicates a remaining period when the remaining number of times of deletion 13110 of the SSD reaches zero. The expected remaining life 13105 is a numerical value expected by the processor 104 (life management program 12300). Here, the expected remaining life 13105 is indicated as the number of days. Here, the expected remaining life 13105 falling below the remaining warranty period 13104 means that an SSD becomes in a higher load state than the vendor's expectation, due to concentration of a load to the specific SSD due to variation of the I/O and the like, and the SSD reaches the end of the life before an expiration date for use guaranteed by the vendor. By execution of the life leveling processing, the concentration of the WR to an RG including the specific SSD can be avoided, and life prolongation of the SSD can be achieved. The expected remaining life 13105 can be calculated based on the information updated date 13103, the FM read total amount 13107, the FM write total amount 13108, the remaining number of times of deletion 13110, and the like. A method of calculating the remaining life period will be described below.

The compression configuration 13106 indicates whether the data compression function of the target disk is valid. The compression configuration 13106 is ON (or a numerical value corresponding to ON (for example, "1")) When the data compression function is valid (in use), and is OFF (or a numerical value corresponding to OFF (for example, "0")) when the data compression function is invalid (not in use). Note that ON/OFF of the data compression function may be configured by a manager of the storage apparatus 10 through control software or the like installed in the host computer 30.

The FM read total amount 13107 is an integrated value of a read amount occurring in the SSD (a data amount read from the flash memories in the SSD), and is updated based on the SSD internal information. The FM write total amount 13108 is an integrated value of a WR amount occurring in the SSD (a data amount written in the flash memories in the SSD), and is updated based on the SSD internal information. The average compression ratio 13109 is a numerical value that indicates what percentage the data size is, compared with an original size, by compression of the data in the SSD. Note that the average compression ratio 13109 is an average value of the compression ratios of the SSDs, and is updated based on the SSD internal information.

The remaining number of times of deletion 13110 indicates a value according to the number of times of block deletion executable in the SSD. In the present example, the remaining number of times of deletion 13110 is a ratio (percentage) of the remaining number of times of deletion to a possible number of deletion determined in advance, and is updated based on the SSD internal information. The value of the remaining number of times of deletion 13110 becoming zero indicates that the numbers of times of deletion of all blocks in the flash memory reaches an upper limit.

The FM read total amount 13107, the FM write total amount 13108, the average compression ratio 13109, and the remaining number of times of deletion 13110 are updated based on information acquired by the storage controller 100 from each SSD. The storage controller 100 acquires the information from each SSD, using a general-purpose interface such as a self-monitoring analysis and reporting technology (S.M.A.R.T.), for example.

The FM use amount 13111 indicates a data amount stored in the SSD, and is updated based on the SSD internal information. The physical capacity 13112 indicates a physical capacity mounted in the SSD. The logical capacity 13113 indicates a logical capacity to the SSD. This logical capacity is a capacity based on the most favorable compression ratio available in the compression/expansion circuit 718, and is a capacity larger than the physical capacity. The storage controller 100 recognizes the logical capacity 13113 as the capacity of the SSD when the compression configuration 13106 is ON, and recognizes the physical capacity 13112 as the capacity of the SSD when the compression configuration 13106 is OFF.

Note that, as for the disk that does not require the exhaustion management (for example, the SSD in which the compression configuration 13106 is OFF), in the disk management TBL 13100, the average compression ratio 13109, the FM use amount 13111, and the logical capacity 13113 may not be acquisition targets by the processor 104. Further, as for the disk that does not require the life management (for example, the HDD), in the disk management TBL 13100, the remaining warranty period 13104, the expected remaining life 13105, the remaining number of times of deletion 13110, and the FM use amount 13111 may not be the acquisition targets by the processor 104.

FIG. 10 is a diagram illustrating a configuration example of the RG management table 13200.

The RG management TBL 13200 includes, for each RG, a RG #13201, a disk type 13202, a RAID level 13203, a RAID configuration 13204, a compression configuration 13205, and a disk #13206.

The RG #13201 is an identifier of an RG and is a unique number. The disk type 13202 indicates a type of disks that configure the RG. The RG is configured from the same type of disks.

The RAID level 13203 indicates a RAID level of the RG. The RAID level takes various values such as RAID 1 +0, 1, 3, 4, 5, and 6. The RAID configuration 13204 indicates the number of data disks (disks that store data) that configure the RAID and the number of parity disks (disks that store parity). The compression configuration 13205 indicates a configuration state of the compression function for the disks that configure the RG. When the compression configuration 13205 is ON, the compression configuration of all of the disks that configure the RG is ON. When the compression configuration 13205 is OFF, the compression configuration of all of the disks that configure the RG is OFF. The disk #13206 indicates numbers (disk #s) of the disks that configure the RG. The disk #13206 includes valid disk #s that are the same number as the number of disks indicated by the RAID configuration 13204.

FIG. 11 is a diagram illustrating a configuration example of the pool management table 13300.

The pool management TBL 13300 includes, for each pool, a pool #13301, an RG #13302, an RG remaining capacity 13303, and a pool remaining capacity 13304.

The pool #13301 is an identifier of a pool and is a unique number. The RG #13302 indicates RG numbers of all of RGs that configure the pool. The RG remaining capacity 13303 indicates a remaining capacity of each RG. The pool remaining capacity 13304 indicates a remaining capacity of the pool, and is equal to a total amount of the RG remaining capacity 13303 of the RGs that configure the pool. The RG remaining capacity 13303 and the pool remaining capacity 13304 are updated by the processor 104 (write I/O program 12100) to a decreased value due to write of data, when write of data occurs in an extent unallocated area of the virtual volume FIG. 12 is a diagram illustrating a configuration example of the entry management table 13800.

The entry management TBL 13800 includes, for each disk, a disk #13801, an entry #13802, a size 13803, a start-LBA 13804, a last-LBA 13805, and allocation destination extent #13806.

The disk #13801 is an identifier (disk #) of a disk and is a unique number. The entry #13802 is an identifier (entry") of an entry created in the disk and is a unique identifier for each disk. The size 13803 indicates a capacity of the entry (for example, in units of byte).

The start-LBA 13804 and the last-LBA 13805 indicate that which number of LBA to which number of LBA of an address space are used to create the entry. To be specific, the start-LBA 13804 is a number of a head LBA of the address space of the entry, and the last-LBA 13805 is a number of a tail LBA of the address space of the entry.

The allocation destination extent #13807 indicates whether the entry has been allocated to an extent. To be specific, when the entry has been allocated to an extent, the allocation destination extent #13807 indicates the extent # of the allocation destination, and when the entry has not been allocated to an extent, the allocation destination extent #13807 indicates "N/A" that indicates unallocation.

FIG. 13 is a diagram illustrating a configuration example of the extent management table 13400.

The extent management TBL 13400 includes, for each extent, an extent #13401, a size 13402, a disk #13403, and an allocation entry #13404.

The extent #13401 is an identifier of an extent and is a unique number. The size 13402 indicates a capacity of the extent (for example, in units of byte). The disk #13403 and the allocation entry #13404 indicate a disk # of the disks that configure the extent and an entry # of the entry.

FIG. 14 is a diagram illustrating a configuration example of the virtual volume management table 13500.

The virtual volume management TBL 13500 includes, for each virtual volume, an LU #13501, a virtual capacity 13502, an actual use capacity 13503, a virtual extent #13504, and an allocation extent #13505.

The LU #13501 is an identifier (LU #) of a virtual volume and is a unique number. The virtual capacity 13502 is a virtual capacity of the virtual volume. A virtual capacity corresponding to the virtual capacity 13502 is provided to the host computer 30. The actual use capacity 13503 is a total value of capacities of extents actually allocated to the virtual volume.

The virtual extent #13504 is an identifier of a virtual extent included in the virtual volume. The example of FIG. 14 illustrates virtual extent #s 0 to n are included in the virtual volume of the LU #0. The virtual extent #s 13504 are arranged in ascending order. To which virtual extent # a logical block address (LBA) specified with an R/W command issued from the host computer 30 corresponds can be obtained by calculation. The allocation extent #13505 is an identifier (number) of an extent allocated to the virtual volume. The storage controller 100 manages an allocation state of an extent, for each virtual extent. In the example of FIG. 14, an extent #0 is allocated to a virtual extent #0, and an extent #100 is allocated to a virtual extent #1. Note that the extent #13505 corresponding to the virtual extent #13504 of the virtual extent to which an extent that is a physical storage area has not been allocated becomes "-" that indicates no extent is allocated. The example of FIG. 14 indicates that no extent is allocated to the virtual extent of a virtual extent # n.

FIG. 15 is a diagram illustrating a configuration example of the statistical information management table 13600.

The statistical information management TBL 13600 is information (input/output amount information) related to access states of R/W and the like to each entry and/or an extent. The storage controller 100 monitors an R/W state in units of entry, and configures the statistical information management TBL 13600. Note that the access state of R/W to an extent can be acquired such that the storage controller 100 adds values of information of entries belonging to each extent, based on the contents of the statistical information management TBL 13600.

The statistical information management TBL 13600 includes, for each disk, a disk #13601, an entry #13602, an average WR I/O size 13603, an average RD I/O size 13604, a WR ratio 13605, a WR amount 13606, and an RD amount 13607. Note that at least one of the information items 13601 to 13607 may sometimes be called statistical information.

The disk #13601 is an identifier of a disk and is a unique number. The extent #13602 is an identifier of an extent based on the disk and is a unique number.

The average WR I/O size 13603 and the average RD I/O size 13604 are average values of I/O sizes of WR I/O and RD I/O occurring in the entry. The WR ratio 13605 is a ratio of the WR command, of I/O requests occurring in the entry. The WR amount 13606 and the RD amount 13607 indicate a total amount of WR data and a total amount of RD data occurring in the entry. Note that the WR amount 13606 and the RD amount 13607 are numerical values that are records of I/O contents requested by the storage controller 100 to the SSD, and thus these numerical values are values become compression. In the present example, the statistical information is monitored in units of entry and/or extent, so that a monitoring load can be decreased, compared with a case where the statistical information is monitored in units of block or page of flash memory.

The storage controller 100 monitors the access state of the extent being allocated, based on the virtual volume management TBL 13500. The statistical information indicates an accumulation value and tendency of R/W of after the extent is allocated to the virtual volume. Note that the statistical information may be an accumulation value per unit time.

Further, the statistical information of the target extent of each processing may be reset after execution of the exhaustion avoidance processing, the life leveling processing, or the I/O performance rebalance processing. For example, the storage controller 100 may reset only the statistical information related to the migrated extent in the life leveling processing.

FIG. 16 is a diagram illustrating a configuration example of the FM WR amount expectation table 13700 in the present example.

The FM WR amount expectation TBL 13700 is configured based on the disk management TBL 13100 and the statistical information management TBL 13600. The FM WR amount expectation TBL 13700 includes, for each disk, a disk #13701, an entry #13702, a WR amount 13703, a compression ratio 13704, and an FM WR expected amount 13705.

The disk #13701 is an identifier of a disk and is a unique number. The entry #13702 is an identifier of an entry and is a unique number.

The WR amount 13703 indicates a total amount of WR data having the entry as a write destination. The WR amount 13703 is updated based on the value of the WR amount 13606 of the statistical information management TBL 13600, in expecting an FM WR amount. The compression ratio 13704 is an average value of the compression ratios in the disk, and is configured based on the internal information acquired from the SSD. The compression ratio 13704 is configured such that the value of the average compression ratio 13109 of the disk management TBL 13100 is copied in expecting the FM WR amount. Note that, in the present example, the average value of the compression ratios of a disk unit is used. Therefore, numerical values of all of the entries are the same value.

The FM WR expected amount 13705 indicates an expected amount (FM WR expected amount) of data actually written in the flash memory. In the present example, a value obtained by multiplying the WR amount 13703 of a certain entry and the average compression ratio 13704 of the entire disk to which the entry belongs is regarded as the FM WR expected amount generated in the entry. Further, the FM WR expected amount in an extent unit can be acquired by calculating a total of the FM WR expected amounts of one or more entries that configure the extent.

For example, if the WR expected amount to the certain extent is large, rewrite of data to a block frequently occurs in the SSD that is the base of the extent, and the number of times of deletion of the block is increased. If the number of times of deletion of the block is increased, life of the SSD having the block becomes short. If the migration target extent is determined based on the WR expected amount of the extent in performing the life leveling, the SSD life can be highly accurately leveled. Note that migration target data may be the entry.

Figure 17:
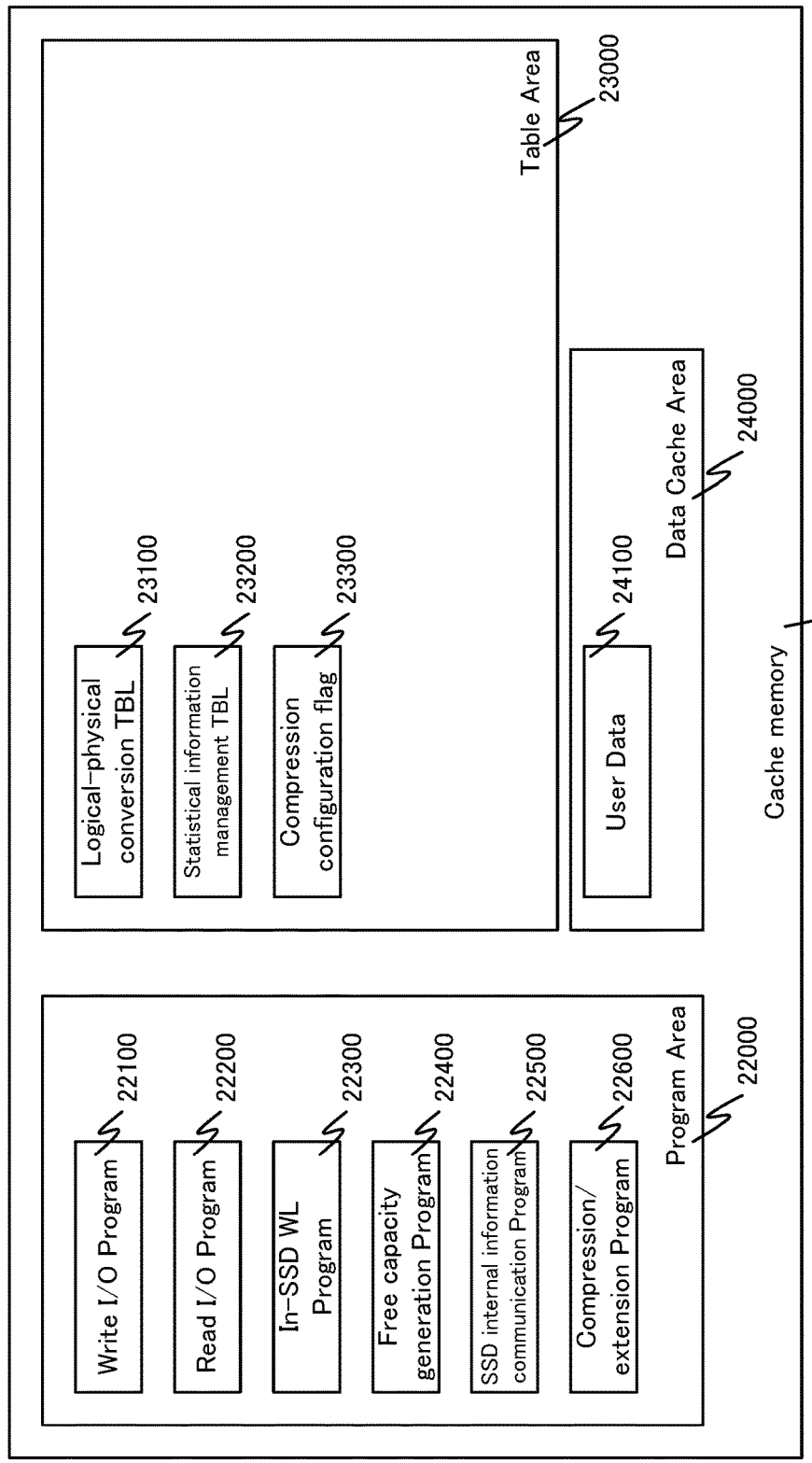
FIG. 17 is a diagram illustrating a configuration example of a cache memory 716.

FIG. 17 is a diagram illustrating a configuration example of the cache memory 716 in the SSD 700.

The cache memory 716 includes a program area 22000, a table area 23000, and a data cache area 24000.

The program area 22000 and the table area 23000 are areas in which programs and various tables for controlling the SSD 700 are stored. The data cache area 24000 is an area for temporarily storing user data.

The program area 22000 includes a write I/O program 22100, a read I/O program 22200, an in-SSD WL program 22300, a free capacity generation program 22400, an SSD internal information communication program 22500, and a compression/expansion program 22600.

The write I/O program 22100 is a program for processing the WR request from the storage controller 100. The read I/O program 22200 is a program for processing the RD request from the storage controller 100. The in-SSD WL program 22300 is a program for executing WL in the SSD. The free capacity generation program 22400 is a program for executing reclamation processing that is performed to avoid exhaustion of the free capacity of the SSD 700.

The SSD internal information communication program 22500 is a program for creating the internal information of the SSD according to the request of the storage controller 100, and for notifying the SSD internal information to the storage controller 100. The compression/expansion program 22600 is a program for executing compression/expansion of data using the processor 713 by the SSD controller 710. Note that the compression/expansion of data may be executed by control of the compression/expansion circuit 718 by the compression/expansion program 22600.

The table area 23000 includes a logical-physical conversion table 23100, a statistical information management table 23200, and a compression configuration flag 23300.

The logical-physical conversion TBL 23100 is a table for managing correspondence between the logical address space and the physical address space of the SSD 700. The statistical information management TBL 23200 is a table for managing the statistical information of the SSD. The compression configuration flag 23300 is a flag that indicates whether the compression configuration of the SSD 700 is ON or OFF.

The data cache area 24000 is an area in which the user data 24100 is stored. Here, the user data 24100 is data written in a block and data read from a block.

FIG. 18 is a diagram illustrating a configuration example of the logical-physical conversion table 23100.

The logical-physical conversion table 23100 includes a start-LBA 23101, a block #23102, a page #23103, and a cord word (CW) #23104.

The start-LBA 23101 indicates a start position of an LBA provided to the storage controller 100. Note that an I/O unit of the flash memory is page, and thus a numerical value of the start-LBA 23101 is managed by a multiple of the page size. The block #23102, the page #23103, and the CW #23104 indicate information (a block #, a page #, and a CW #) of the physical address space corresponding to the start-LBA 23101. Note that, in the present example, the SSD has the data compression function, and thus 2 pages or more of the logical address space may be mapped in 1 page of the physical page. FIG. 18 illustrates that the logical address space corresponding from the LBA 0 to the LBA 8191, and the logical address space corresponding from the LBA 8192 to the LBA 16383 are stored in the same physical page (the page #0 of the block #0). Further, the start-LBA 23101 corresponds to the logical address space 900. Therefore, there is one having no WR from the storage controller 100, and to which no physical page is actually allocated. In this case, the block #23102, the page #23103, and the CW #23104 that indicate a physical address space corresponding to the start-LBA are invalid information.

FIG. 19 is a diagram illustrating a configuration example of the statistical information management table 23200 in the SSD.

In the statistical information management TBL 23200, information notified by the processor 713 in response to a request from the storage controller 100 is stored. The statistical information management TBL 23200 includes a write request total amount 23211, a read request total amount 23212, an FM write total amount 23213, an average compression ratio 23214, an FM read total amount 23215, and a remaining number of times of deletion 23216.

The write request total amount 23211 and the read request total amount 23212 are respective total amounts of WR-requested data and read-requested data, from the storage controller 100 to the SSD 700, and the respective total amounts become the same values as the total of the WR amount 13606 and the total of the RD amount 13607 in the statistical information management TBL 13600. The FM write total amount 23213 and the FM read total amount 23215 are a total value of data actually written in the FM 780, and a total value of data actually read from the FM 780. Note that these values include an R/W amount occurring in the SSD in the processing such as reclamation, other than the R/W request from the storage controller 100. The FM write total amount 23213 becomes the same value as the FM use amount 13111 of the disk management TBL 13100.

The average compression ratio 23214 is an average value of the compression ratios of the compressed data obtained by the data compression processing in the SSD. The remaining number of times of deletion 23216 is a value obtained by subtracting a total value of the number of times of deletion of the FM occurring due to WR of data to the FM, from the maximum number of times of deletion supported by the vendor. The numerical value of the statistical information management TBL 23200 is updated when R/W or deletion of data occurs.

Figure 20:
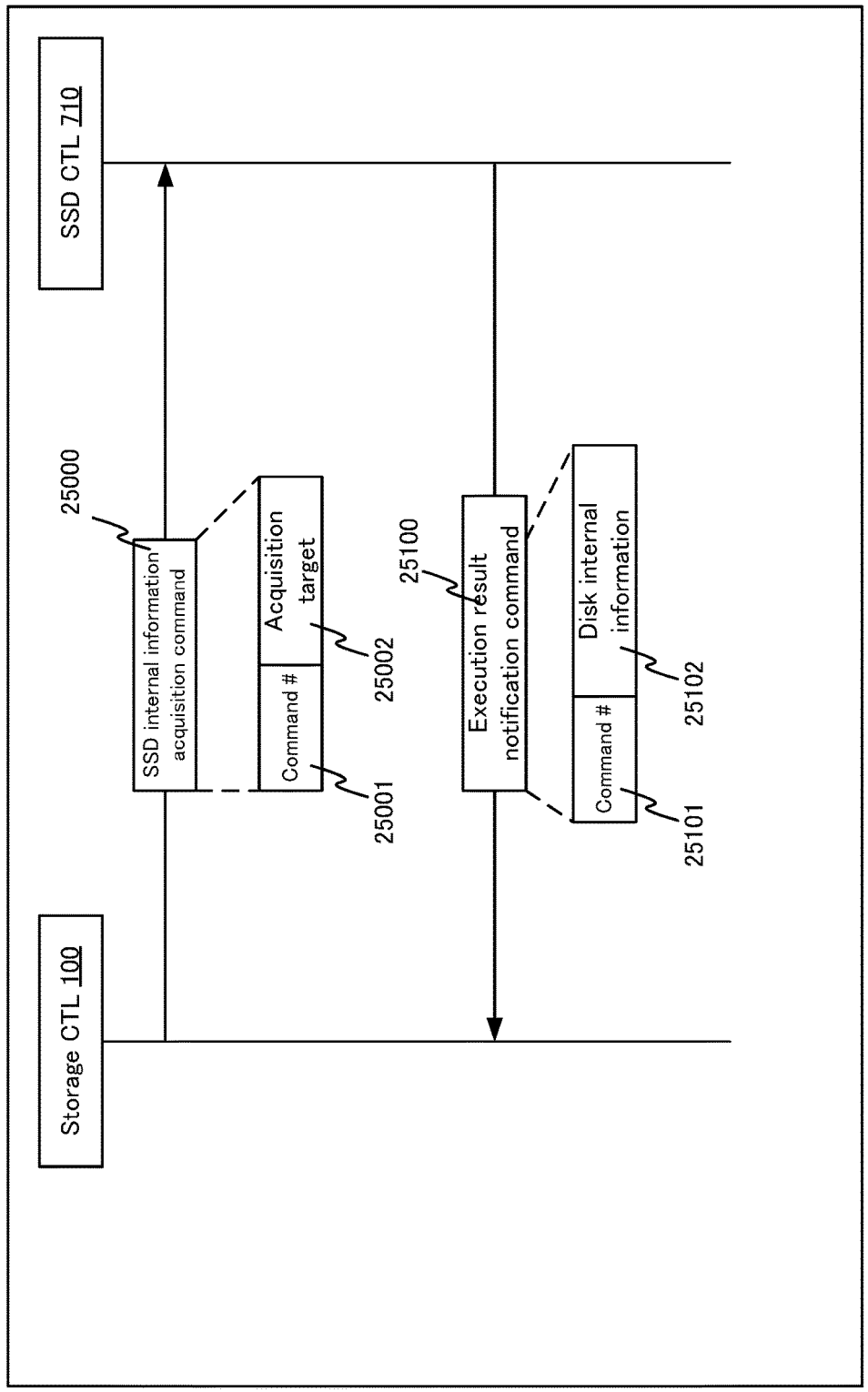
FIG. 20 is a diagram illustrating a configuration example of an SSD internal information acquisition command 25000, and an execution result notification command 25100 that is a response of the SSD internal information acquisition command 25000.

FIG. 20 is a diagram illustrating a configuration example of an SSD internal information acquisition command 25000 and an execution result notification command 25100 that is a response of the SSD internal information acquisition command 25000.

The SSD internal information acquisition command 25000 is a command transmitted from the storage controller 100 to the SSD 700.

The SSD internal information acquisition command 25000 includes, for example, a command #25001 and an acquisition target 25002. The command #25001 is an identifier (command #) of the command. The acquisition target 25002 is an item of a target that the storage controller 100 wishes to acquire from the SSD. To be specific, the acquisition target 25002 indicates which item value is required, of the items included in the statistical information management TBL 23200 of the SSD 700.

The execution result notification command 25100 is a command transmitted from the SSD 700 to the storage controller 100, and includes response contents to the SSD internal information acquisition command 25000. The execution result notification command 25100 includes, for example, a command #25101 and disk internal information 25102. The command #25101 indicates to which request command the response is, and is the command #25001 corresponding to the request command. The disk internal information 25102 is a response value to the contents specified in the acquisition target 25002, and this value is a value calculated or copied from the statistical information management TBL 23200 of the SSD.

Figure 21:
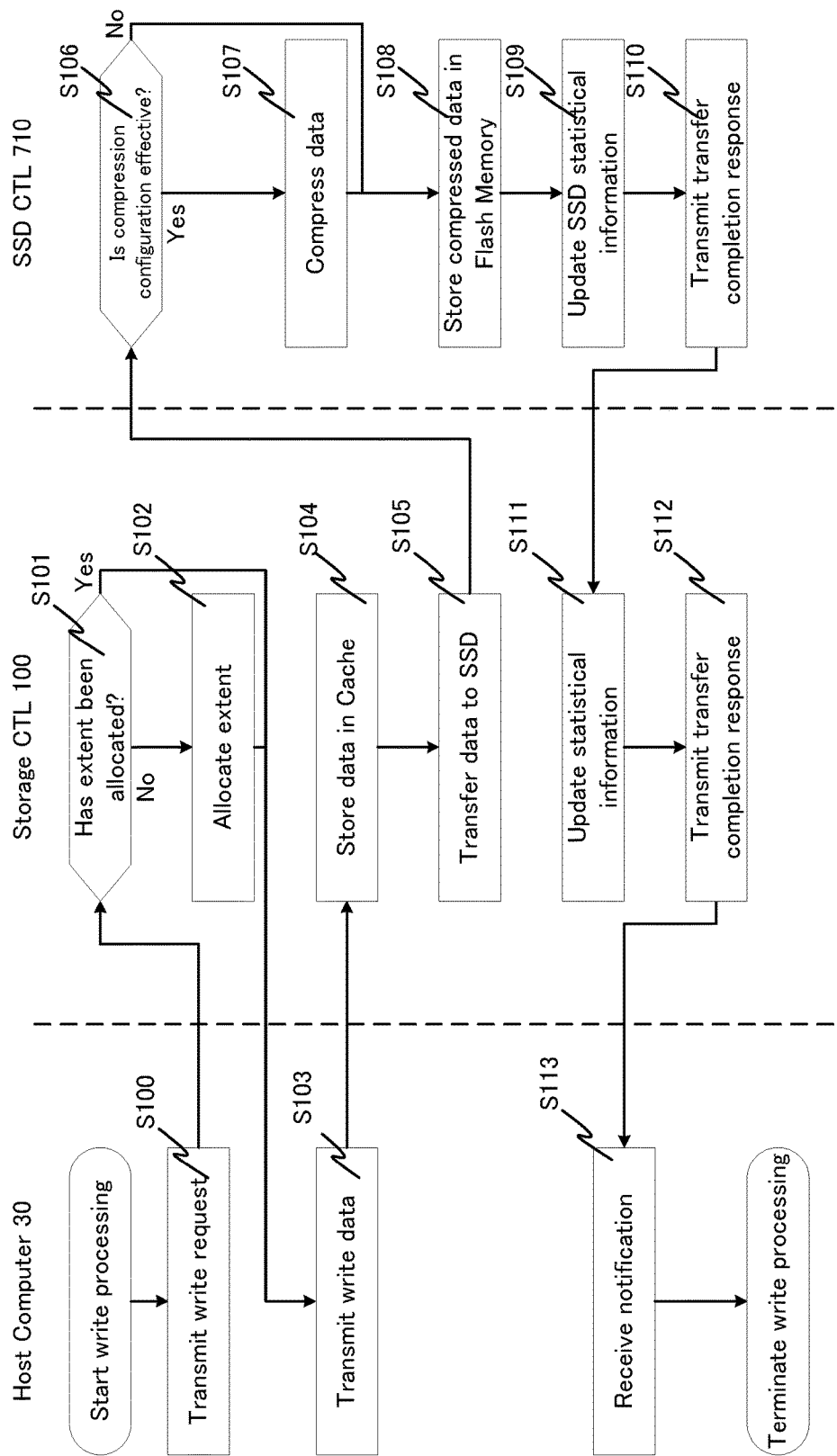
FIG. 21 is a sequence diagram illustrating an example of a flow of processing related to write processing of a host computer 30.

FIG. 21 is a sequence diagram illustrating an example of a flow of processing related to write processing of the host computer 30. Note that processing of the storage controller 100 in FIG. 21 is realized by execution of the write I/O program 12100, and processing of the SSD controller 710 is realized by execution of the write I/O program 22100.

The host computer 30 transmits the WR request to the storage controller 100 (S100). The storage controller 100 receives the WR request, and determines whether the extent has been allocated to a WR destination range (the address range of the virtual volume) indicated by the WR request, based on the virtual volume management table 13500 (S101). Note that the storage controller 100 can allocate the extent to the WR destination range indicated by the WR request, upon reception of the WR request.

As a result of the determination, when the extent has already been allocated (Yes in S101), the storage controller 100 prompts the host computer 30 to transmit WR data. Meanwhile, when the extent has not yet been allocated (No in S101), the storage controller 100 finds an unallocated extent, allocates the extent to the virtual extent in the WR destination range (S102), and prompts the host computer 30 to transmit the WR data.

Next, the host computer 30 transmits the WR data (S103), and the storage controller 100 stores the received data in the cache memory 103 (S104). Note that the storage controller 100 may allocate the extent when transferring the data from the cache memory 103 to the SSD 700.

Next, the storage controller 100 transmits, to the SSD controller 710 of the SSD 700 that is a storage destination of data, the data stored in the cache memory 103, and the WR request about the data (S105).

The SSD controller 710 receives the data and the WR request from the storage controller 100, and determines whether the data compression is effective, by reference to the own compression configuration flag 23100 (S106). As a result, when the data compression is effective (Yes in S106), the SSD controller 710 compresses the data (S107), determines the FM position (the block #, the page #, and the CW #) of the storage destination of the data, by reference to the logical-physical conversion TBL 23100, and stores the data in the determined FM position (S108).

Meanwhile, when the data compression configuration is ineffective (No in S106), the SSD controller 710 does not perform the data compression, determines the FM position of the storage destination of data, based on the logical-physical conversion TBL 23100, and stores the data in the determined FM position (S108).

After execution of S108, the SSD controller 710 updates the write request total amount 23211, the FM write total amount 23213, the average compression ratio 23214, and the remaining number of times of deletion 23216 of the statistical information management TBL 23200 related to the received data (S109). Next, the SSD controller 710 transmits a transfer completion response to the storage controller 100, as a response to the WR request received in S106 (S110).

When having received the transfer completion response from the SSD controller 710, the storage controller 100 updates the average WR I/O size 13603, the WR ratio 13605, and the WR amount 13606 of the statistical information management TBL 13600 (S111). Following that, the storage controller 100 transmits the transfer completion response to the host computer 30, as a response to the WR request received in S101 (S112).

When having received the transfer completion response from the storage controller 100, the host computer 30 terminates the series of processing (S113).

Note that the storage controller 100 may transmit the transfer completion response to the host computer 30 at a time point when storing the data in the cache memory 103, and then transfer the data from the cache memory 103 to the SSD 700. Such processing is called post WR processing, and is known as a method that improves WR processing performance of the storage controller 100.

Figure 22:
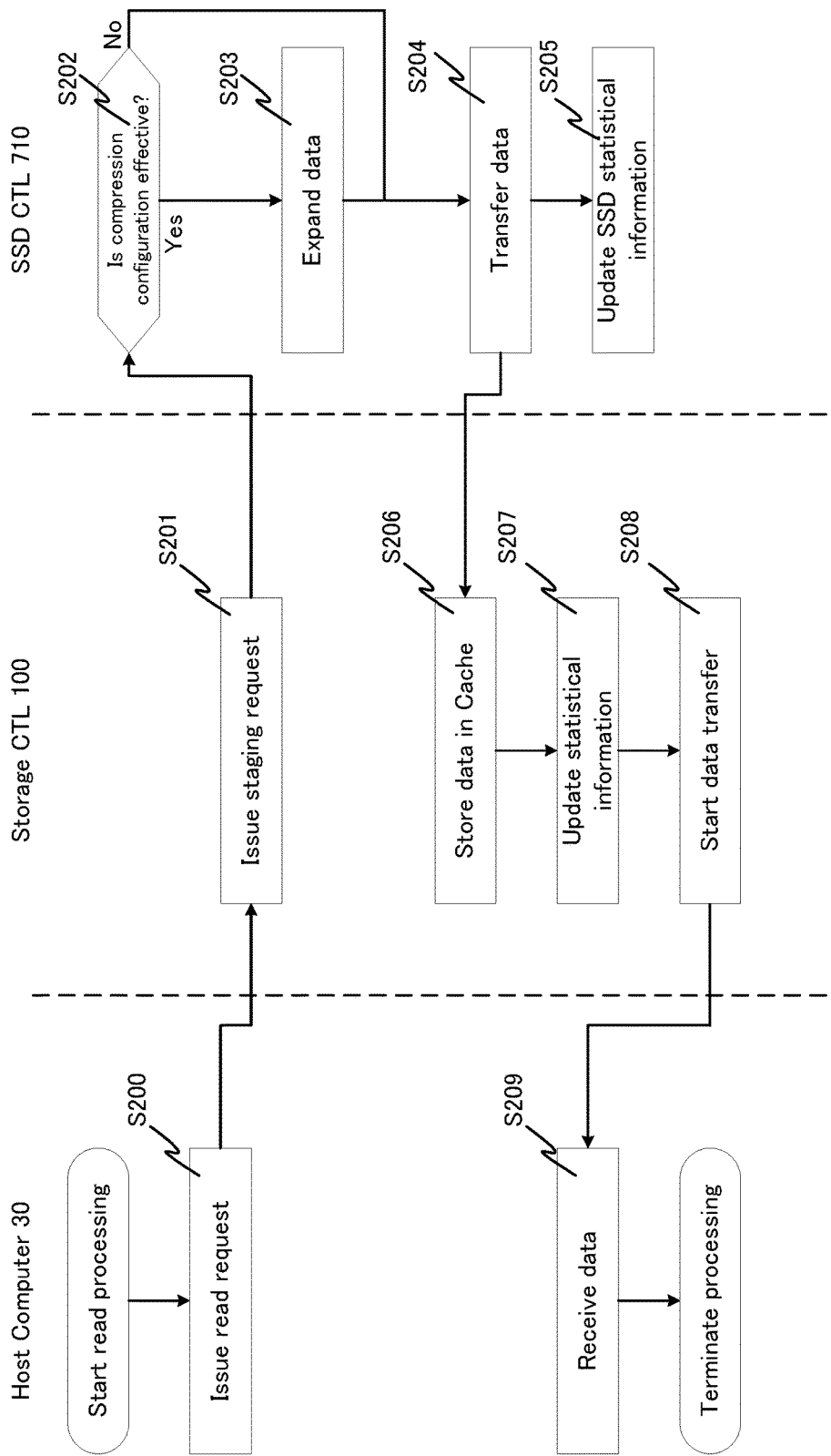
FIG. 22 is a sequence diagram illustrating an example of a flow of processing related to read processing of the host computer 30.

FIG. 22 is a sequence diagram illustrating an example of a flow of processing related to read processing of the host computer 30. Note that processing of the storage controller 100 in FIG. 22 is realized by execution of the read I/O program 12200, and processing of the SSD controller 710 is realized by execution of the read I/O program 22200.

The host computer 30 transmits the RD request of data to the storage controller 100 (S200).

The storage controller 100 receives the RD request of data, identifies the SSD 710 to serve as the base of the extent allocated to an RD range (the address range of the virtual volume) according to the RD request, and transmits the RD request (staging request) of data to the SSD controller 710 of the identified SSD 710 (S201).

The SSD controller 710 receives the RD request of data, identifies the physical address range corresponding to the logical address range according to the RD request, based on the logical-physical conversion TBL 23100, and performs processing of reading data from the physical address range (one or more pages). In this processing, the SSD controller 710 confirms whether the data compression is effective (S202), and when the data compression is effective (Yes in S202), the SSD controller 710 expands the read data (S203), and transmits the expanded data to the storage controller 100 (S204). Meanwhile, when the data compression is not effective (No in S202), the SSD controller 710 transmits the read data to the storage controller 100 without performing expansion (S204).

Next to S204, the SSD controller 710 updates the read request total amount 23212 and the FM read total amount 23215 in the statistical information management TBL 23200 (S205).

When having received the data from the SSD controller 710, as a response to the RD request transmitted in S201, the storage controller 100 stores the received data in the cache memory 103 (S206), and updates the average RD I/O size 13604, the WR ratio 13605, and the RD amount 13607 of the statistical information management TBL 13600 (S207). Following that, the storage controller 100 transmits the data stored in the cache memory 103 in S206 to the host computer 30 (S208).

When having received the data from the storage controller 100, as a response to the RD request transmitted in S200, the host computer 30 terminates the read processing (S209).

Figure 23:
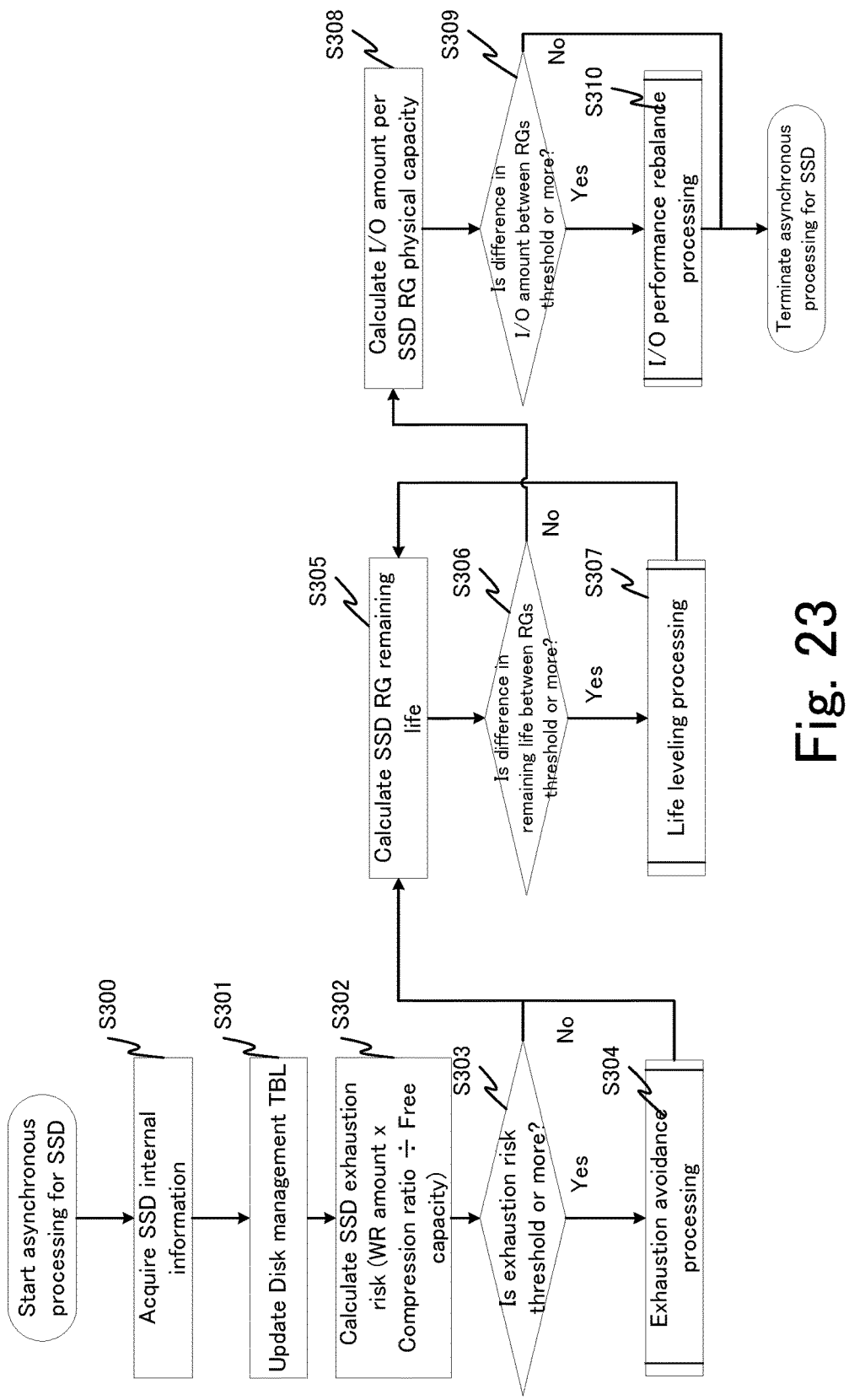
FIG. 23 is a flowchart illustrating an example of asynchronous processing for SSD.

FIG. 23 is a sequence diagram illustrating an example of a flow of the asynchronous processing for SSD.

The storage controller 100 requests the SSD controller 710 to transmit the internal information, using the SSD internal information acquisition command 25000 (see FIG. 20). The storage controller 100 receives the execution result notification command 25100 from the SSD controller 710, as a response to the request (S300). The information acquired in the processing of S300 is the data (the FM write total amount 23213, the average compression ratio 23214, the FM read total amount 23215, and the remaining number of times of deletion 23216) stored in the statistical information management TBL 23200.

The storage controller 100 updates the disk management TBL 13100, based on the acquired internal information (S301). To be specific, the storage controller 100 updates the FM write total amount 13108 and the FM use amount 13111, based on the FM write total amount 23213, updates the FM read total amount 13107, based on the FM read total amount 23215, updates the average compression ratio 13109, based on the average compression ratio 23214, and updates the remaining number of times of deletion 13110, based on the remaining number of times of deletion 23216.

Next, the storage controller 100 calculates the exhaustion risk of the disk, based on the information of the disk management TBL 13100 (S302). Here, the exhaustion risk is an index for determining ease of exhaustion of the disk. In the present example, the disk is more easily exhausted, as the numerical value is larger, in the present example. The exhaustion risk is calculated by the WR amount to the disk×the average compression ratio÷the free capacity. That is, the exhaustion risk becomes higher, as the WR frequency is higher, the compression ratio is worse, and the free capacity is smaller. The WR amount to the disk is a total of the WR amounts 13606 in the statistical information management TBL 13600 in a disk unit, the average compression ratio is the average compression ratio 13109 of the disk management TBL 13100, and the free capacity can be calculated by subtracting the FM use amount 13111 from the physical capacity 13112 of the disk management TBL 13100.

Next, the storage controller 100 determines whether the exhaustion risk is equal to or larger than a threshold, and determines whether executing the exhaustion avoidance processing (S303). Note that the threshold may be configured by the manager of the storage apparatus 10 through control software or the like installed in the host computer 30. When the exhaustion risk is equal to or larger than the threshold, and the exhaustion avoidance processing is determined to be necessary (Yes in S303), the storage controller 100 executes the exhaustion avoidance processing (see FIG. 25) (S304), and advances the processing to S305 after termination of the exhaustion avoidance processing. Meanwhile, the exhaustion risk is not equal to or larger than the threshold, and the exhaustion avoidance processing is determined to be unnecessary (No in S303), the storage controller 100 advances the processing to S305.

The storage controller 100 determines necessity of the life leveling processing in S305, and thus calculates the remaining life in an RG unit (S305). Here, the remaining life in an RG unit may be a worst value of the remaining lives of the SSDs that configure the RG, or may be an average value of the remaining lives of the SSDs. A method of calculating the remaining lives of the SSDs will be described below using FIG. 24. The storage controller 100 stores the calculated remaining lives of the SSDs in the expected remaining life 13105 of the disk management TBL.

Next, the storage controller 100 obtains a difference in the remaining lives between the RGs, and determines whether the difference is equal to or larger than a threshold and whether executing the life leveling processing (S306). Note that the threshold may be configured by the manager of the storage apparatus 10 through the control software or the like installed in the host computer 30. Note that whether executing the life leveling processing may be determined according to whether there is an SSD that ends the life before the warranty period (whether there is an SSD having a smaller expected remaining life 13105 than the remaining warranty period 13104).

As a result, when the difference is equal to or larger than the threshold, and the life leveling processing is determined to be necessary (Yes in S306), the storage controller 100 executes the life leveling processing (see FIG. 26) (S307). When the life leveling processing is terminated, the processing proceeds to S305 again. Accordingly, the remaining life of the RG of the SSD is calculated again about a state after the life leveling processing, and whether the difference in the remaining lives is equal to or larger than the threshold is determined in S306.

Meanwhile, when the difference is not equal to or larger than the threshold, and the life leveling processing is determined to be unnecessary (No in S306), the storage controller 100 calculates the I/O amount per RG physical capacity in order to determine necessity of the I/O performance rebalance processing (S308). Here, the I/O amount per RG physical capacity is calculated by the I/O amount of the RG×the average compression ratio÷the RG physical capacity. The I/O amount of the RG can be calculated by calculating the I/O amounts of the SSDs from the WR amount 13606 and the RD amount 13607 of the statistical information management TBL 13600, and adding the I/O amounts of the SSDs that configures the RG. The average compression ratio is the worst numerical value of the compression ratio in the RGs from the average compression ratio 13109 of the disk management TBL 13100. The RG physical capacity can be calculated by adding the physical capacities of the SSDs that configure the RG from the physical capacity 13112 of the disk management TBL 13100.

Next, the storage controller 100 obtains a difference in the I/O amounts per physical capacity between the RGs, determines whether the difference is equal to or larger than a threshold, and determines whether executing the I/O performance rebalance processing (S309). As a result, when the difference is equal to or larger than the threshold (Yes in S309), the storage controller 100 executes the I/O performance rebalance processing (see FIG. 29) (S310), and terminates the asynchronous processing for SSD after termination of the I/O performance rebalance processing. Meanwhile, the difference is less than the threshold (No in S309), the storage controller 100 terminates the asynchronous processing for SSD.

Note that the asynchronous processing for SSD may be executed at arbitrary timing, may be executed in regular intervals (every other day), or may be executed at timing when a specific command has been received. Further, the asynchronous processing for SSD may be executed by an indication of execution opportunity of the present processing from the control software of the host computer 30 by the user.

Further, according to FIG. 23, the processing is performed in descending order of priority in which the exhaustion avoidance processing has the highest priority, the life leveling processing has the second highest priority, and the I/O performance rebalance processing has the lowest priority. However, the priority of each processing may be different from the priority of FIG. 23. For example, the priority of the I/O performance rebalance processing may be higher than the priority of the life leveling processing.

Further, there is a plurality of types of data arrangement control processing such as the exhaustion avoidance processing, the life leveling processing, and the I/O performance rebalance processing (processing in which data migration between storage devices is caused). The storage controller 100 may determine, before performing any of the data arrangement control processing (the target data arrangement control processing), whether a condition to skip the data arrangement control processing having higher priority (previously performed data arrangement control processing) than the target data arrangement control processing remains satisfied even if the target data arrangement control processing is performed. The "condition to skip the data arrangement control processing having higher priority remaining satisfied" means that the condition to be satisfied by the dada arrangement control processing having higher priority remains satisfied. Examples include the exhaustion risk remaining less than the threshold, the difference in the remaining lives between the RGs remaining less than the threshold, and the difference in the I/O amounts between the RGs remaining less than the threshold. When a result of the determination is affirmative, the storage controller 100 may perform the target data arrangement control processing. When a result of the determination is negative, the storage controller 100 may skip the target data arrangement control processing (does not need to perform the processing).

Figure 24:
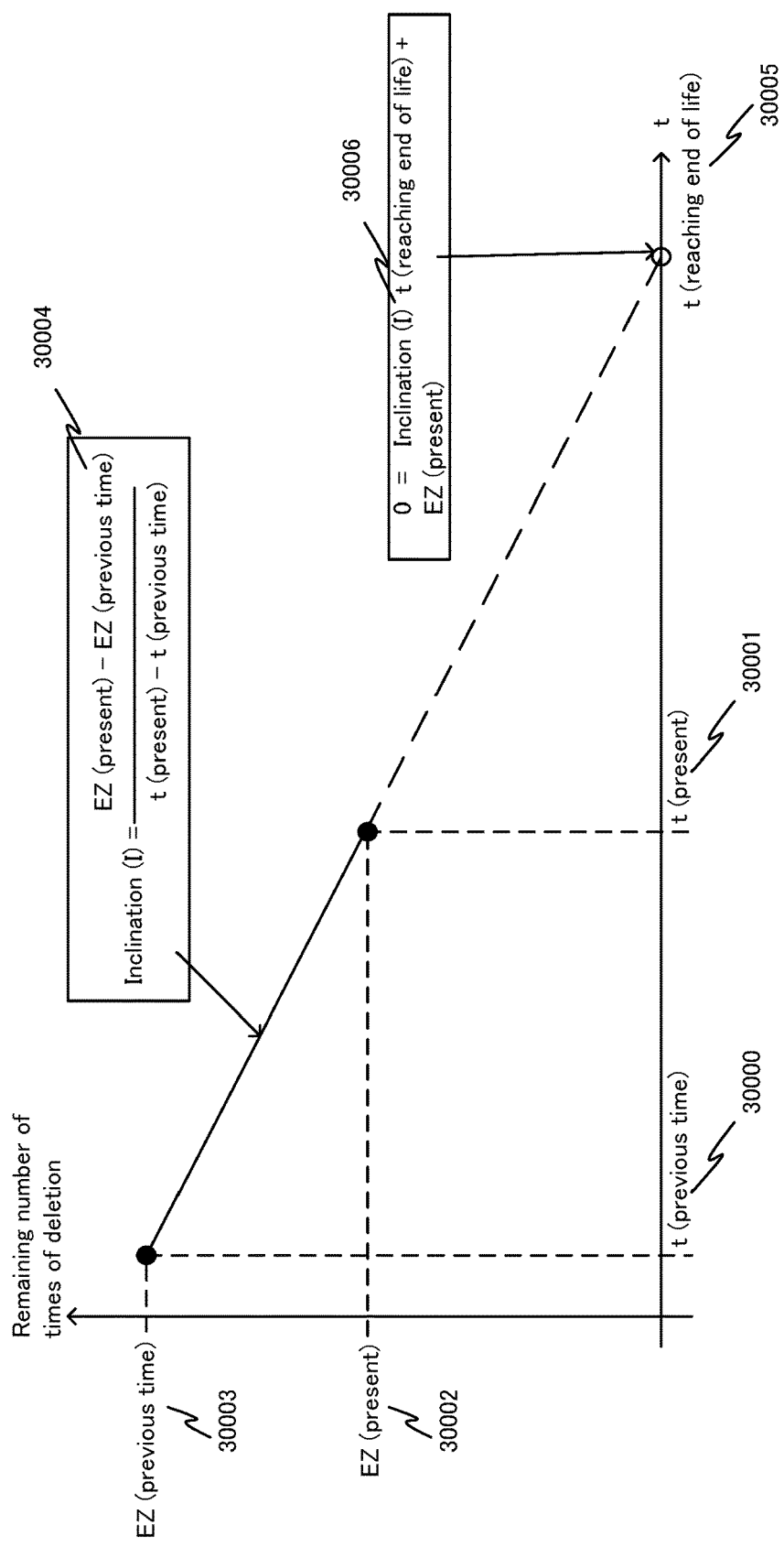
FIG. 24 is an explanatory diagram of an outline of life expectation of an SSD.

FIG. 24 is an explanatory diagram of an outline of life expectation of an SSD. The life expectation of an SSD is processing executed in S305 of FIG. 23. The diagram of FIG. 24 has time in the horizontal axis, and the remaining number of times of deletion of the SSD in the vertical axis.

As an example of a life expectation method of an SSD, a method of expecting an arrival time point to the end of the life of the SSD from a rate of decrease in the remaining number of times of deletion will be described. Here, the life of the SSD is a period in which the SSD can be actually used. When WR is concentrated in a certain SSD, the life of the SSD becomes short. Therefore, it is necessary to perform life leveling processing (to be specific, processing of exchanging data stored in the extent or the entry between the SSDs) so that another SSD having a long life can be actively used. Note that, in the life leveling processing, an SSD having a short remaining life (an SSD in which the remaining life is equal to or less than a threshold) is detected.

In FIG. 24, t (previous time) 30000 represents a time point (previous life expectation time) when the life expectation is performed in the previous time, and is a time point corresponding to a value of the information updated date 13103 of the disk management TBL 13100. EZ (previous time) 30003 represents the remaining number of times of deletion in the previous life expectation time, and is the number of times of the remaining number of times of deletion 13110. Further, t (present) 30001 is a time point when the life expectation of this time is performed. EZ (present) 30002 is the present remaining number of times of deletion, and is a value that can be acquired from the SSD internal information acquired this time.

First, an inclination (I) is calculated by the following expression (1).

$$\text{The inclination } (I) = (EZ \text{ (present)} - EZ \text{ (previous time)}) \div (t \text{ (present)} - t \text{ (previous time)}) \qquad (1)$$

Here, the rate of decrease in the remaining number of times of deletion is larger as the inclination (I) 30004 is larger.

Next, t (reaching end of the life) is calculated by the following expression (2), using the inclination (I) 30004 and the EZ (present) 30001 that is the remaining number of times of deletion of the present time point.

$$\text{The } t \text{ (reaching end of the life)} = -(EZ \text{ (present)} \div \text{the inclination } (I)) \qquad (2)$$

The t (reaching end of the life) 30005 is a time when the remaining number of times of deletion becomes zero, that is, an end of life arrival time. In this way, the remaining life period can be calculated from the remaining number of times of deletion and the rate of decrease in the remaining number of times of deletion. The remaining life period is stored in the expected remaining life 13105 of the disk management TBL 13100.

It is important that the storage device and the storage apparatus are continuously used for a predetermined period (for the warranty period, five years, for example), and the data is guaranteed. Therefore, the life leveling processing is executed using the warranty period as one index, so that a plurality of storage devices (the SSDs, for example) can be used for a period equal to or larger than the warranty period. Note that, when the total amount of all write of data that can be written by when the SSD reaches the end of the life is known, t (reaching end of the life) may be calculated having the vertical axis of FIG. 24 as the remaining write amount (a value obtained by subtracting the FM write total amount 13108 from the total amount of all write).

Figure 25:
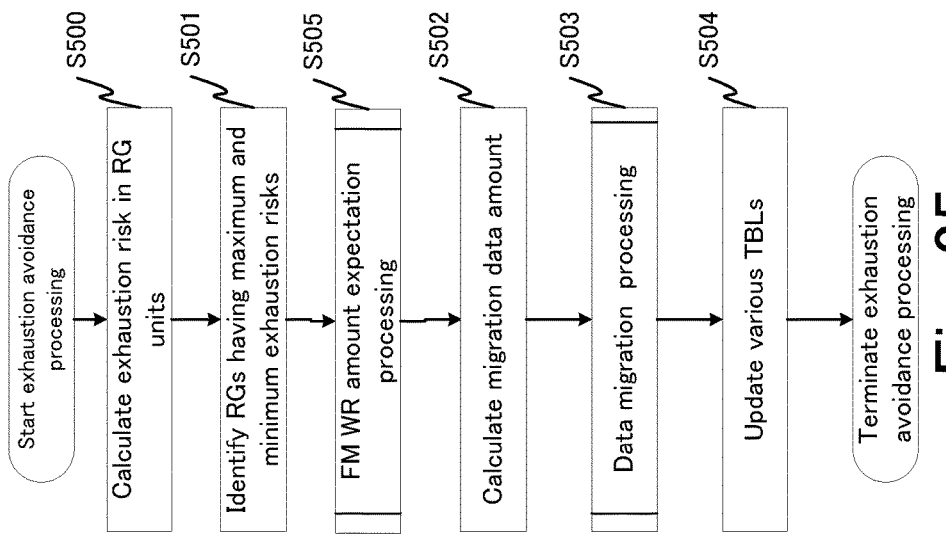
FIG. 25 is a flowchart illustrating an example of exhaustion avoidance processing according to the first example.

FIG. 25 is a flowchart illustrating an example of the exhaustion avoidance processing according to the first example. The exhaustion avoidance processing corresponds to the processing of S304 of FIG. 23.

The storage controller 100 calculates the exhaustion risk of an RG unit in all of the RGs in the pool 500 (S500). The exhaustion risk of an RG unit may be the worst value of the exhaustion risk of an SSD unit calculated in S302 of FIG. 23, in the SSD 700 that configures the RGs, or may be an average value of the exhaustion risks of the SSD that configure the RGs.

Next, the storage controller 100 identifies the RG having the highest exhaustion risk and the RG having the lowest exhaustion risk (S501). Next, the storage controller 100 performs the FM WR amount expectation processing (see FIG. 27) of expecting the FM WR amount of each entry or extent, based on the statistical information management TBL 13600 and the statistical information management TBL 23200 of the SSD 700 (S505).

Next, the storage controller 100 calculates the migration data amount (S502). As the migration data amount, a value that falls below a threshold may be the migration amount, or a value of leveling the exhaustion risks between the target RGs (the RG having the maximum exhaustion risk and the RG having the minimum exhaustion risk) may be the migration amount. The threshold may be configured by the manager of the storage apparatus 10 through the control software or the like installed in the host computer 30.

Next, the storage controller 100 executes the data migration processing (see FIG. 37) of migrating data by the determined amount (S503). Finally, the storage controller 100 updates the information of the various TBLs (S504), and terminates the exhaustion avoidance processing.

According to the exhaustion avoidance processing, the data having a large FM WR amount is migrated from the RG having a high exhaustion risk to the RG having a low exhaustion risk in units of extent, so that the risk of exhaustion of SSD can be decreased by the smallest number of times of extent migration.

Figure 27:
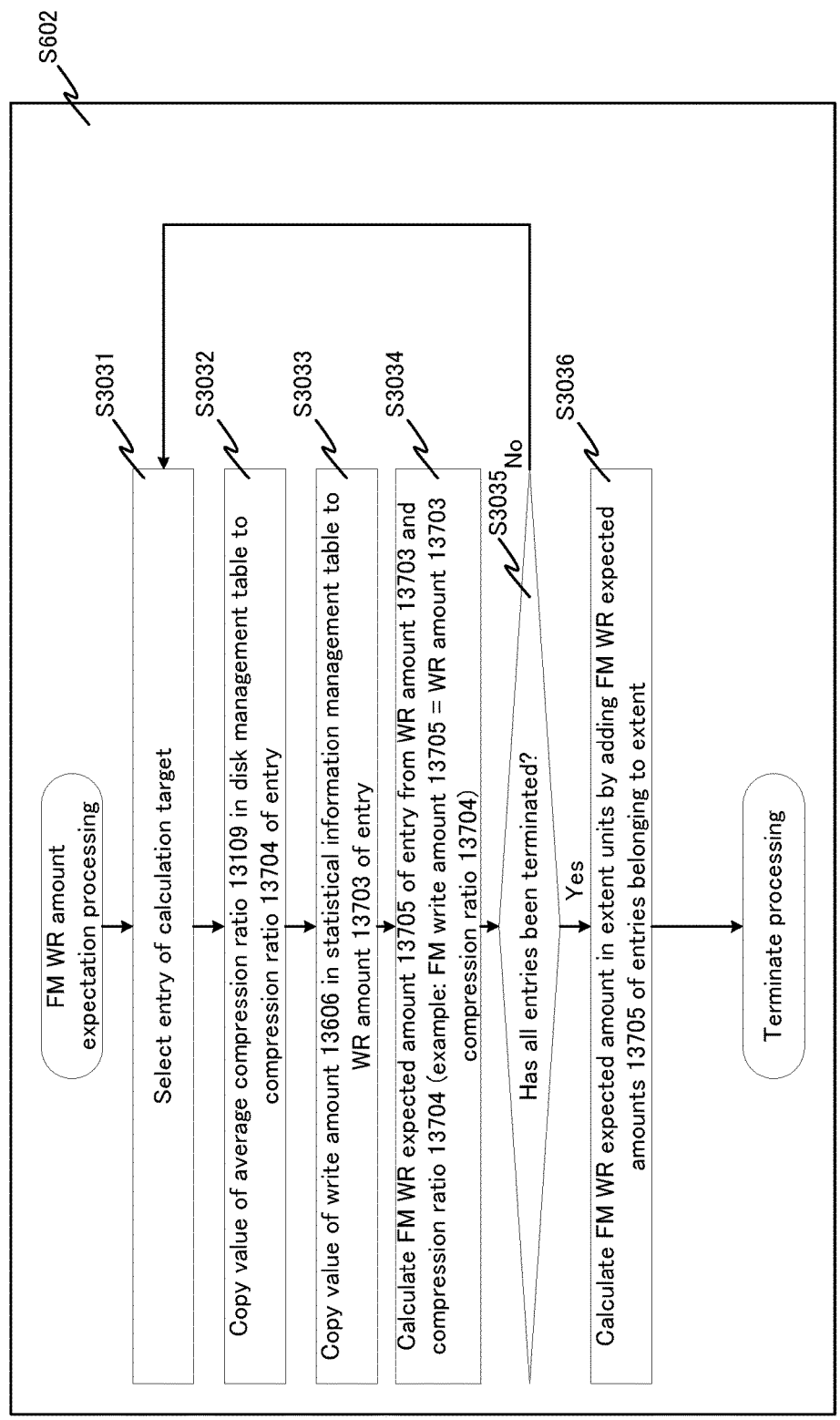
FIG. 27 is a flowchart illustrating an example of FM WR amount expectation processing according to the first example.

FIG. 27 is a flowchart illustrating an example of the FM WR amount expectation processing according to the first example. The FM WR amount expectation processing corresponds to the processing of S505 of FIG. 25. The FM WR amount expectation processing is processing in which the storage controller 100 calculates the FM WR expected amount 13705 of the FM WR amount expectation TBL 13700.

The storage controller 100 selects an entry that is a calculation target of expectation of the FM write amount (S3031). Next, the storage controller 100 stores (copies) a value acquired from the average compression ratio 13109 of the disk management TBL 13100 to the compression ratio 13704 of the selected entry (S3032). Following that, the storage controller 100 acquires the WR amount 13606 corresponding to the entry from the statistical information management TBL 13600, for the WR amount 13703 of the entry, and stores (copies) the acquired data (S3033).

Following that, the storage controller 100 calculates the FM WR expected amount 13705 of the entry, by multiplying the WR amount 13703 and the compression ratio 13704 (S3034). Next, the storage controller 100 determines whether the calculation target entry remains (S3035), and when the calculation target entry remains (No in S3035), the storage controller 100 selects the next entry, and repeats the processing from S3032 to S3035. Meanwhile, in S3035, when having determined that no calculation target entry remains (Yes in S3035), the storage controller 100 calculates the FM WR expected amount of each extent (S3036). To be specific, the storage controller 100 identifies entries belonging to each extent, by reference to the extent management TBL 13400, and calculates a total value of the FM WR expected amounts 13705 of the identified entries. Following that, the storage controller 100 terminates the FM WR amount expectation processing.

Figure 37:
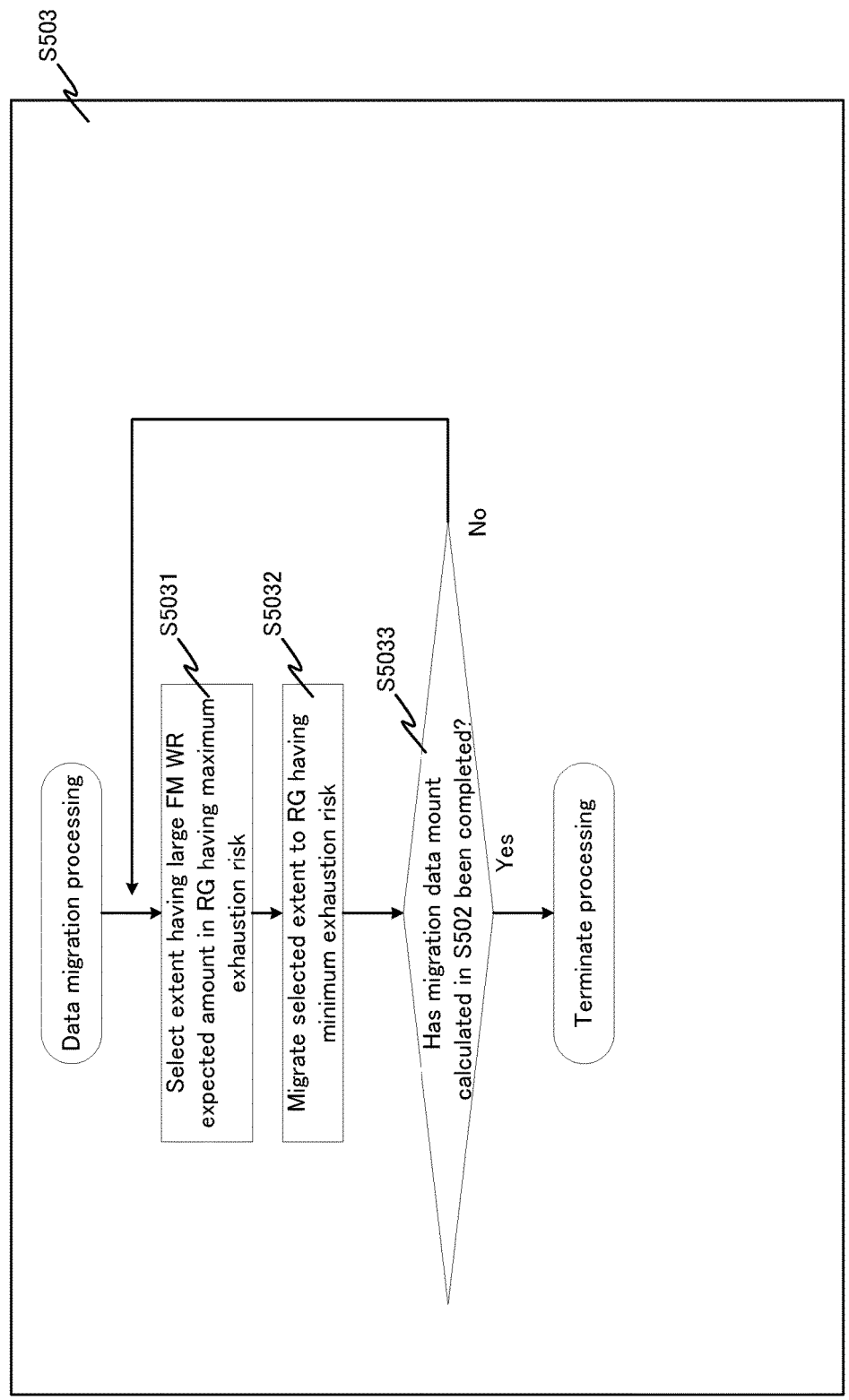
FIG. 37 is a flowchart illustrating an example of the data migration processing in the exhaustion avoidance processing according to the first example.

FIG. 37 is a flowchart illustrating an example of the data migration processing in the exhaustion avoidance processing according to the first example. The exhaustion avoidance processing corresponds to the processing of S503 of FIG. 25.

The storage controller 100 selects an extent having a large FM WR expected amount calculated in the FM WR amount expectation processing of S505, from among the RGs having the maximum exhaustion risk identified in S501 of FIG. 25 (S5031). The extent having a large FM WR expected amount is an extent having the largest FM WR expected amount in the plurality of extents.

Next, the storage controller 100 migrates the selected extent to the RG having the minimum exhaustion risk identified in S501 of FIG. 25 (S5032). Next, the storage controller 100 determines whether the data amount migrated from the RG having the maximum exhaustion risk to the RG having the minimum exhaustion risk has reached the migration data amount calculated in S502 of FIG. 25 (S5033).

As a result, if the result is negative (No in S5033), the storage controller 100 repeats the processing from S5031. Meanwhile, when the result is affirmative (Yes in S5033), the storage controller 100 terminates the data migration processing.

According to the processing, the FM WR expected amount of the RG having a high exhaustion risk is migrated to the RG having a low exhaustion risk, so that the risk of exhaustion of SSD can be decreased by the smallest number of times of extent migration.

Figure 26:
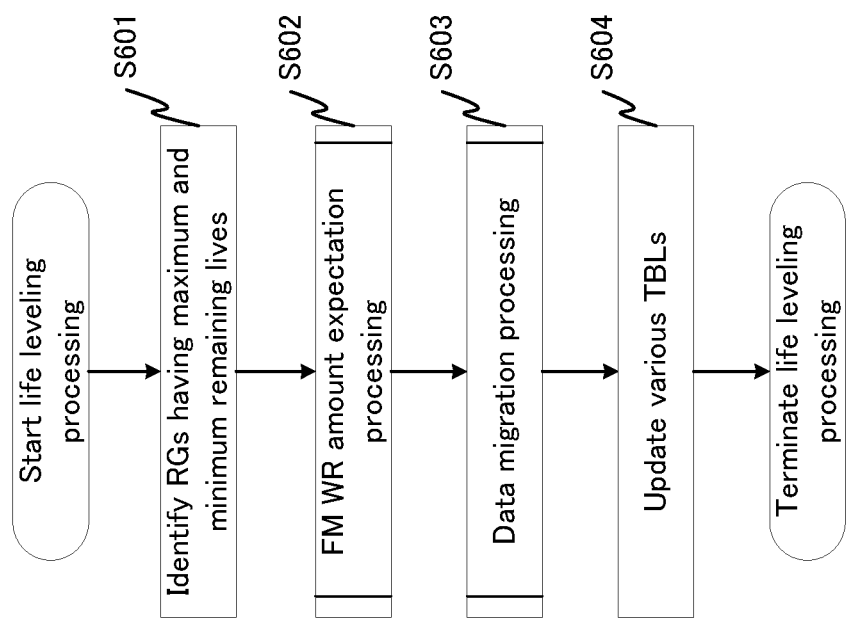
FIG. 26 is a flowchart illustrating an example of life leveling processing according to the first example.

FIG. 26 is a flowchart illustrating an example of the life leveling processing according to the first example. The life leveling processing corresponds to the processing of S307 of FIG. 23.

The storage controller 100 identifies the RG having the maximum remaining life and the RG having the minimum remaining life (S601), and executes the FM WR amount expectation processing (see FIG. 27) of expecting the FM WR amount of each extent, based on the statistical information management TBL 13600 and the statistical information management TBL 23200 of the SSD 700 (S602).

Following that, the storage controller 100 executes the data migration processing (see FIG. 28) of executing data migration (S603), updates the various tables (S604), and terminates the life leveling processing.

Figure 28:
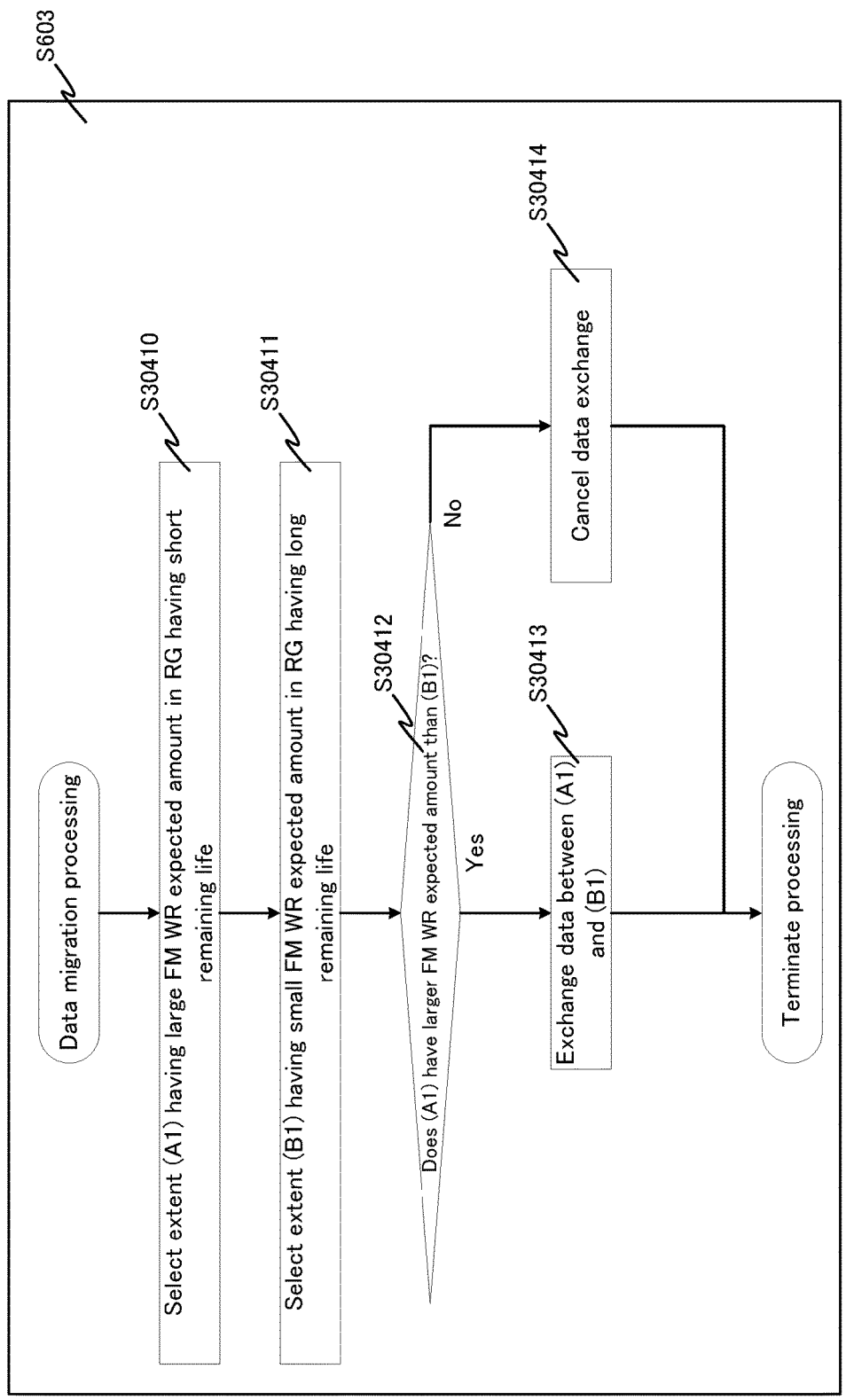
FIG. 28 is a flowchart illustrating an example of data migration processing in the life leveling processing according to the first example.

FIG. 28 is a flowchart illustrating an example of the data migration processing in the life leveling processing according to the first example. The data migration processing is processing corresponding to S603 of FIG. 26.

The storage controller 100 selects an extent (A1) having a large FM WR expected amount, in the RG having a short life identified in S601 of FIG. 26 and serving as a migration source of data of the life leveling processing (S30410). Here, the extent having a large FM WR expected amount is an extent having the largest FM WR expected amount in a plurality of extents.

Next, the storage controller 100 selects an extent (B1) having a small FM WR expected amount, in the RG having a long life identified in S601 of FIG. 26 and serving as a migration destination of the life leveling processing (S30411). The extent having a small FM WR expected amount is an extent having the smallest FM WR expected amount in a plurality of extents. Note that extends having an FM WR expected amount that is equal to or less than a threshold may be grouped, and one extent may be selected from the group.

Then, the storage controller 100 determines whether the FM WR expected amount of the extent (A1) is larger than the FM WR expected amount of the extent (B1) (S30412). When the FM WR expected amount of the extent (B1) is larger than the FM WR expected amount of the extent (A1), if the data of the extent (B1) is migrated to the RG having a short remaining life, the WR data amount to the RG is further increased, and the number of times of deletion cannot be leveled between the devices. Therefore, the determination is performed and the data exchange is cancelled, so that the number of times of deletion can be appropriately leveled between the devices, without unnecessary data migration.

When a result of the determination is affirmative (Yes in S30412), the processor 104 exchanges the data in the extent (A1) and the data in the extent (B1) (S30413), and terminates the data migration processing. Meanwhile, when the result of the determination is negative (No in S30412), the processor 104 cancels the data exchange (S30414), and terminates the present processing.

By exchange of the extent having a large FM WR expected amount of the RG having a short remaining life, and the extent having a small FM WR expected amount of the RG having a long remaining life, the WR data amount to the SSD that configures the RG having a short remaining life is decreased. Therefore, the decrease in the remaining life can be suppressed. Meanwhile, the WR data amount of the RG having a long remaining life is increased. Therefore, the gap of the remaining life between RGs can be decreased by the data exchange. That is, the SSD life can be leveled.

Figure 29:
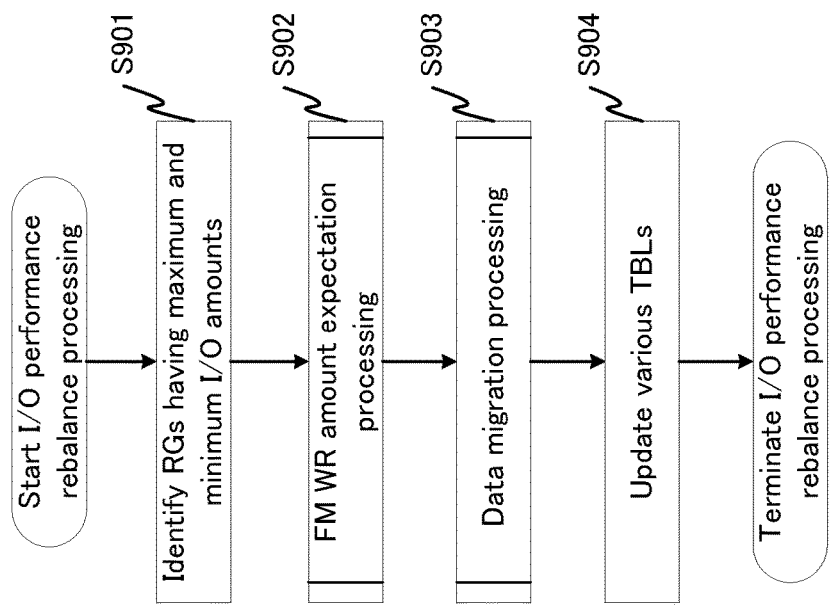
FIG. 29 is a flowchart illustrating an example of I/O performance rebalance processing according to the first example.

FIG. 29 is a flowchart illustrating an example of the I/O performance rebalance processing according to the first example. The I/O performance rebalance processing corresponds to the processing of S310 of FIG. 23.

The storage controller 100 identifies the RG having the maximum I/O amount per RG physical capacity, and the RG having the minimum I/O amount per RG physical capacity (S901), and expects FM RD/WR expected amounts (the FM RD expected amount and the FM WR expected amount) per entry or extent, based on the statistical information management TBL 13600 and the statistical information management TBL 23200 of the SSD 700 (S902). To be specific, the processing is processing of expecting the FM RD expected amount as well, by similar processing to the FM WR amount expectation processing illustrated in FIG. 27.

Following that, the storage controller 100 executes the data migration (S903), updates the various tables (S904), and terminates the performance I/O rebalance processing. In S903, the storage controller 100 decreases the I/O amount to the RG having a large I/O amount, and increases the I/O amount to the RG having a small I/O amount, by exchanging the data between the extent having a large I/O amount of the RG having a large I/O amount per RG physical capacity (FM RD/WR expected amounts), and the extent having a small I/O amount of the RG having a small I/O amount per RG physical capacity, by the processing similar to the data migration processing illustrated in FIG. 28. Therefore, the gap of the I/O amount between RGs can be decreased by the data exchange. That is, the storage controller 100 can level the I/O performance. By the I/O performance rebalance processing, the stored data is migrated from the RG having a large I/O amount to the RG having a small I/O amount in units of extent, so that a bottleneck of performance can be avoided.

SECOND EXAMPLE

Next, a second example will be described. In the second example, a different portion from the first example will be mainly described.

While, in the first example, the compression ratio has been acquired as the average value of an SSD unit, in the second example, a compression ratio is acquired in units of entry. To be specific, an SSD controller 710 provides a data compression ratio of an entry unit to a response command to be transmitted to a storage controller 100 at the time of completion of WR. By reference to the data compression ratio included in the response command, the storage controller 100 can manage the compression ratio for each entry.

Accordingly, expectation accuracy of an FM WR expected amount of each entry can be enhanced, compared with the first example, and as a result, execution accuracy of life leveling processing can be improved.

FIG. 30 is a diagram illustrating a configuration example of a statistical information management table 13600 according to the second example.

The statistical information management table 13600 according to the second example includes a compression ratio 13608 that indicates the compression ratio of each entry, in order to acquire the compression ratio for each entry, in addition to the statistical information management table 13600 according to the first example. Note that a method of acquiring/updating the compression ratio 13608 will be described in detail using FIG. 32.

FIG. 31 is a diagram illustrating a configuration example of an FM WR amount expectation table 13700 according to the second example.

The FM WR amount expectation TBL 13700 according to the second example is different from the FM WR amount expectation TBL 13700 according to the first example, in that a compression ratio 13704 is managed for each entry #13702. As described above, the compression ratio 13704 is managed for each entry #13702, so that a difference in the compression ratio can be appropriately managed when the compression ratio is changed due to a difference in a data pattern or the like, even in the case of the same disk 11.

Figure 32:
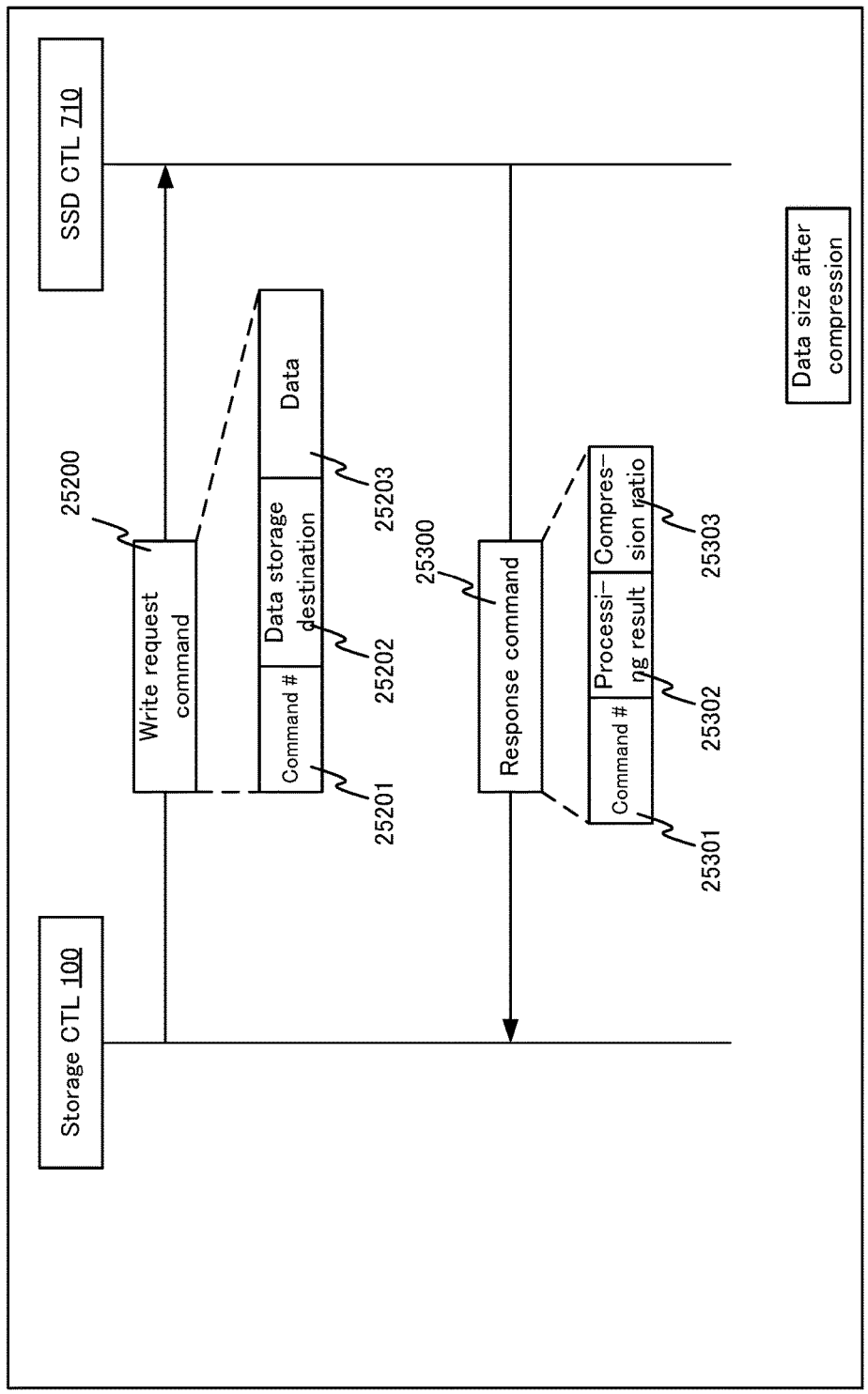
FIG. 32 is a diagram illustrating a configuration example of a WR request command 25200 according to the second example and a response command 25300.

FIG. 32 is a diagram illustrating a configuration example of a WR request command 25200 and a response command 25300 according to the second example.

The write request command 25200 according to the second example is a WR request transmitted by the storage controller 100 to the SSD controller 710, and includes a command #25201, a data storage destination 25202, and data 25203. The command #25201 is an identifier for managing a plurality of WR request commands, and a unique numerical value. The data storage destination 25202 indicates a disk # that is the storage destination of the WR request data, an LBA, and the like. The data 25203 is data to be actually written.

The response command 25300 is a command transmitted by the SSD controller 710 to the storage controller 100, and in which an execution result to the received WR request is stored. The response command 25300 includes a command #25301, a processing result 25302, and a compression ratio 25303.

The command #25301 is used to manage to which write request command 25200 the response is, and indicates a value corresponding to the command #25201. The processing result 25302 is a value indicating whether the WR request has succeeded. The storage controller 100 can confirm an outcome of the WR request issued to an SSD, by referring to the value of the processing result 25302. As the compression ratio 25303, a compression ratio of data in an entry is stored.

Processing related to write processing according to the second example will be described using the sequence diagram of the processing related to the write processing according to the first example illustrated in FIG. 21. Note that different points from the first example will be described.

The write request command 25200 is used in processing (S105) in which the storage controller 100 requests the SSD controller 710 to write data, in the processing related to the write processing of FIG. 21. Further, the response command 25300 is used in processing (S110) in which the SSD controller 710 notifies a result of the WR processing to the storage controller 100.

In S111, the storage controller 100 acquires the compression ratio described in the response command 25200, and updates the compression ratio 13608, based on the acquired compression ratio, when updating the statistical information management TBL 13600.

Figure 33:
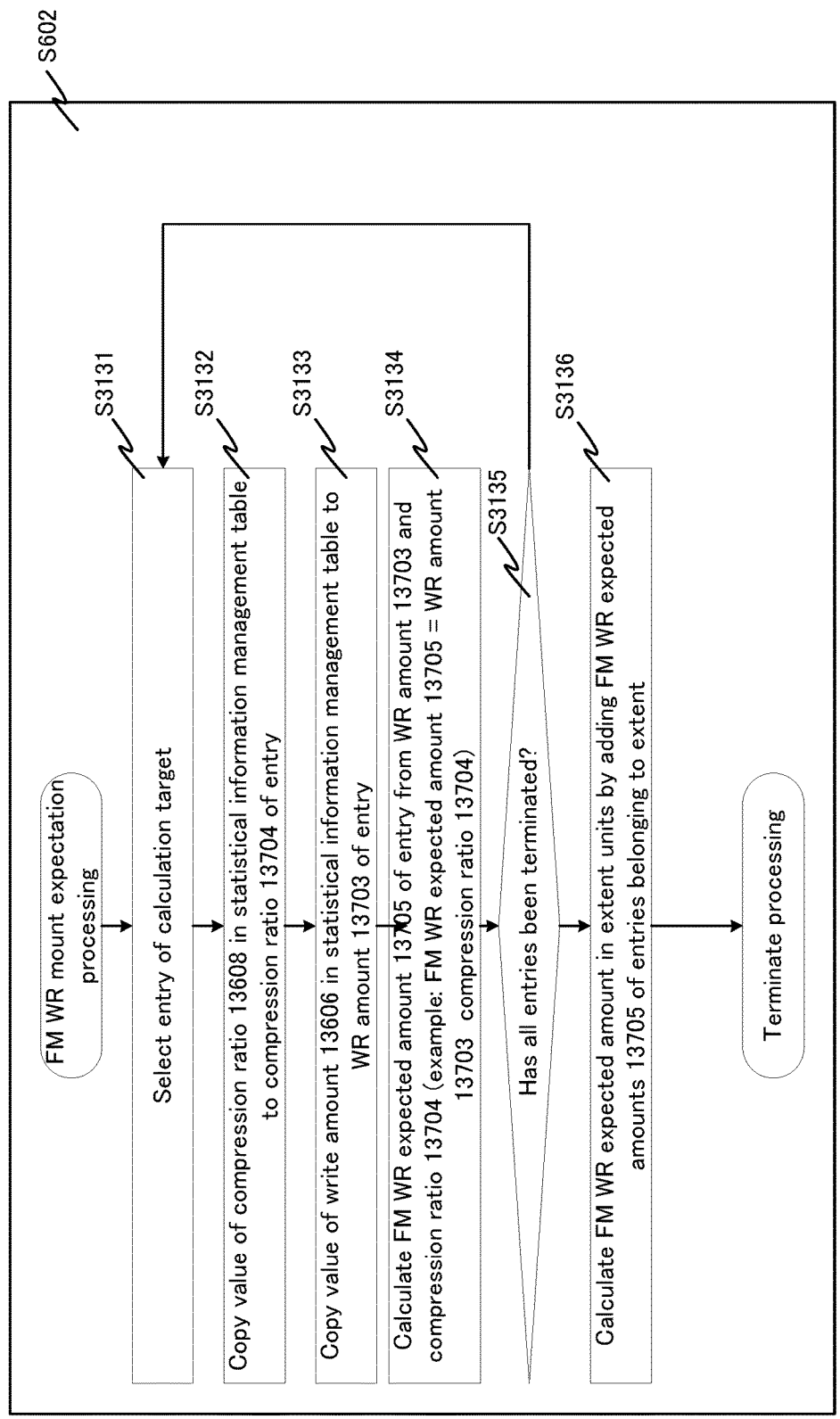
FIG. 33 is a flowchart illustrating an example of FM WR amount expectation processing according to the second example.

FIG. 33 is a flowchart illustrating an example of FM WR amount expectation processing according to the second example. The FM WR amount expectation processing according to the second example is processing corresponding to S602 of FIG. 26.

A difference between the FM WR amount expectation processing according to the second example and the FM WR amount expectation processing (see FIG. 27) according to the first example is that the compression ratio 13608 of the statistical information management TBL 13600 is stored in S3132, for the compression ratio 13704 of entry, instead of storing the average compression ratio 13109 of the disk management TBL of the disk management TBL 13100.

THIRD EXAMPLE

Next, a third example will be described. Note that only different points from the first and second examples will be described in the third example.

In the third example, write amplification (WA) is added to information for expectation of an FM WR amount, in addition to the compression ratio.

Typically, processing unique to an SSD such as WL or reclamation occurs inside an SSD 700. Therefore, a data amount actually written in a flash memory is larger than a data amount actually acquired by the SSD 700 from a storage controller 100. A ratio of the data amount actually written in a flash memory to the received data amount is called WA. An increase in a WR data amount due to the processing inside the SSD also depends on an access pattern, a size of WR data, and the like.

When the WR data amount is increased due to the unique processing inside the SSD 700, the number of times of deletion is increased. Therefore, in the third example, the storage controller 100 additionally acquires the WA from the SSD controller 710, and adds a value thereof to the information for expectation of the FM WR expected amount, thereby to further improve accuracy of life leveling processing.

First, the WA will be described.

The WA is a ratio ((b)/(a)) obtained by dividing (b) by (a). Here, (a) is the data amount received by the SSD 700 from the storage controller 100, and (b) is the data amount to be actually written in a flash memory.

For example, when the SSD 700 receives WR data from the storage controller 100 in a state where no data is written in the SSD 700, the data is written in a free page, as it is, and thus there is a high possibility that the WA becomes "1.0". Further, when valid data is written in a page of the SSD 700, and there is no free page and reclamation processing is necessary, a page serving as a migration destination of the valid data and a page in which the data from the storage controller 100 is written are necessary. Therefore, the WA exceeds "1.0". Note that the reclamation processing is processing of generating a block having invalid data, by integrating pages in which valid data is stored and writing the valid data to another block, when a free block begins to be exhausted, and generating a free block, by deleting the data in the block having invalid data.

Therefore, to accurately expect the data WR amount to the FM, the WA that is a parameter indicating an internal copy amount needs to be taken into consideration. Therefore, in the third example, the storage controller 100 newly acquires the WA from the SSD 700 through the SSD internal information acquisition command, and adds the WA to the information for expectation of the FM WR expected amount.

FIG. 34 is a diagram illustrating a configuration example of a disk management TBL 13100 according to the third example. The disk management table 13100 according to the third example newly includes a WA 13114 that indicates a WA of each disk. As the WA 13114, a numerical value acquired by the storage controller 100 from an SSD through the SSD internal information acquisition command is stored.

FIG. 35 is a diagram illustrating a configuration example of an FM WR amount expectation table 13700 according to the third example.

The FM WR amount expectation table 13700 according to the third example newly include a WA 13706 that indicates a WA of each disk. As the WA 13706, a value of the WA 13114 of the disk management TBL 13100 is copied in expecting an FM write amount. In the third example, an FM write expected amount 13705 is calculated by multiplying a write amount 13703 of an entry, a compression ratio 13704, and the WA 13706.

Figure 36:
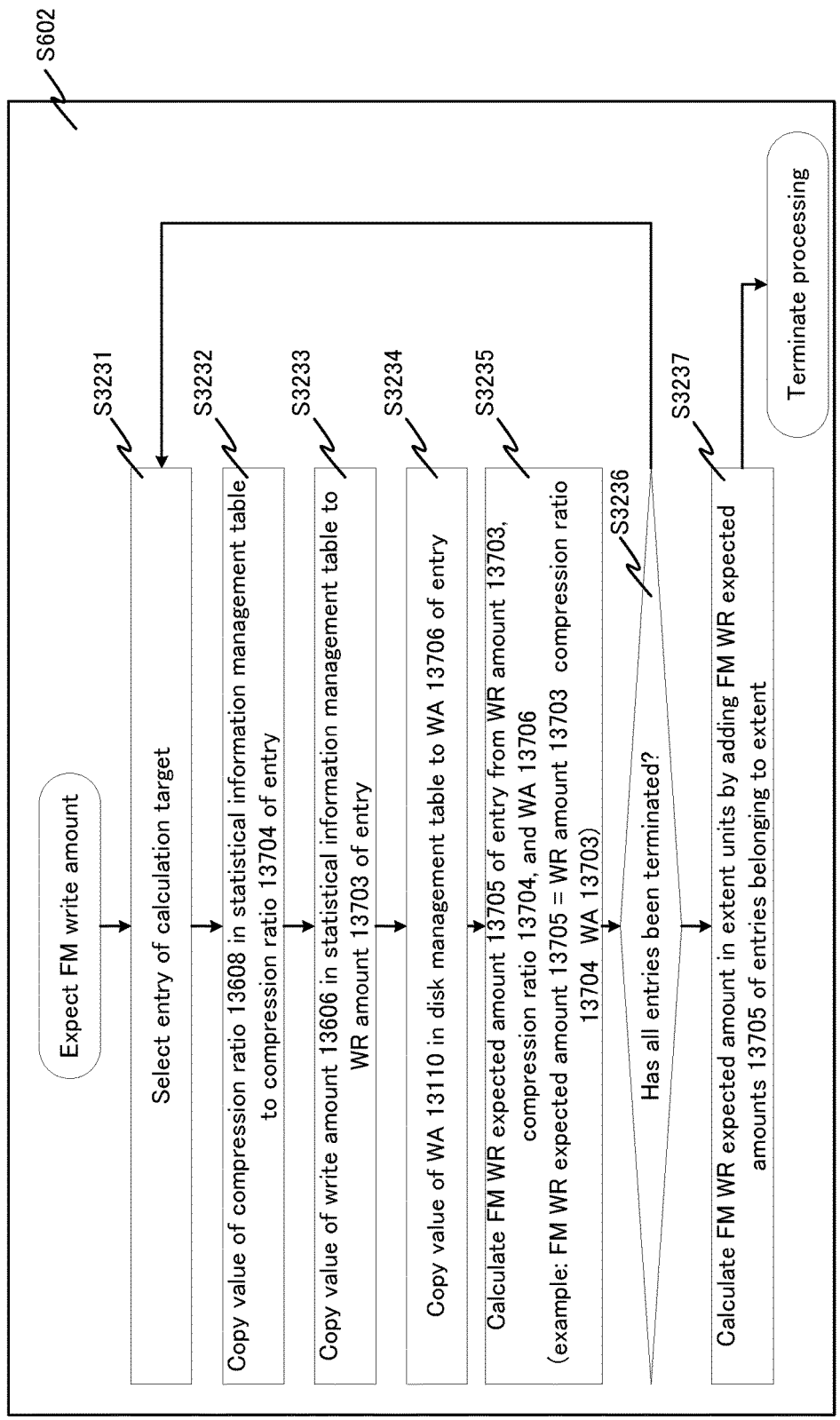
FIG. 36 is a flowchart illustrating an example of FM WR amount expectation processing according to the third example.

FIG. 36 is a flowchart illustrating an example of FM WR amount expectation processing according to the third example. The FM WR amount expectation processing according to the third example is processing corresponding to S602 of FIG. 26.

Differences between the FM WR amount expectation processing according to the third example, and the FM WR amount expectation processing (FIG. 27) according to the first example and the FM WR amount expectation processing (FIG. 33) according to the second example are that processing of acquiring the WA 13706 of an entry from the WA 13114 of the disk management TBL 13100 and storing the WA 13706 (S3234) is performed, and a method of calculating an FM WR expected amount (S3235) is performed by multiplication of the WR amount 13703, the compression ratio 13704, and the WA 13706.

According to the FM WR amount expectation processing, a state inside the SSD (for example, the FM WR expected amount 13705) is expected by the storage controller 100, based on the statistical information 25200, even if it is difficult to recognize internal information of the SSD 700 in details, so that the life leveling processing can be highly accurately realized.

As described above, an embodiment and some examples have been described. However, the present invention is not limited to the embodiment and the examples, and various changes can be made without departing from the gist of the invention.

For example, in the second example, the compression ratio of an entry unit is notified from the SSD 700 to the storage controller 100, and in the third example, the WA of an entry unit is notified from the SSD 700 to the storage controller 100. However, the FM use amount of an entry unit may be notified from the SSD 700 to the storage controller 100. Accordingly, the storage controller 100 does not need to expect the FM WR amount, and can execute the life leveling processing, using the FM use amount as it is notified from the SSD 700. Therefore, the load (calculation amount) of the storage controller 100 can be suppressed. Further, when the SSD 700 has the data compression function, and the data WR amount managed by the storage controller 100 and the actual FM WR amount inside the SSD are different, the storage controller 100 can highly accurately realize the life leveling processing and the I/O performance rebalance processing.

Flash memory has a characteristic that destruction of data is easily caused even when data is repeatedly read from a page. Therefore, a typical SSD has a function to store an ECC that is an error correction code of data in the page together with data, and recover a partially caused error with the ECC at the time of reading data. Further, such an SSD has a function to migrate the data to another page if the number of data error occurrence exceeds a certain threshold. Therefore, deletion of the flash memory may occur even under circumstances where only RD of data occurs. Therefore, as information for making a decision of the life leveling processing, the information (the number of RD I/Os and/or the data RD amount) related to the RD of each extent or entry may be used.

Further, in the first to third examples, the storage controller 100 has performed the processing of converting the remaining number of times of deletion into the remaining number of days. However, the SSD 700 may notify the remaining number of days to the storage controller 100. This can be realized such that the SSD 700 has a function to convert the remaining number of times of deletion into the remaining number of days, as illustrated in FIG. 24.

In the first to third examples, the exhaustion avoidance processing, the life leveling processing and the I/O performance rebalance processing are executed in units of extent. However, these types of processing may be performed in different units (for example, in units of entry or LU).

When an RG in compression configuration (compressed RG) and an RG in decompression configuration (noncompressed RG) are mixed in the storage apparatus 10, the exhaustion avoidance processing, the life leveling processing, and the I/O performance rebalance processing may be performed between the compressed RG and the noncompressed RG. Further, a plurality of patterns of migration policies of the respective types of processing is prepared in the storage apparatus 10, including: (1) the exhaustion avoidance processing, the life leveling processing, and the I/O performance rebalance processing are allowed only between the compressed RGs, (2) the life leveling processing and the I/O performance rebalance processing are allowed only between the noncompressed RGs, (3) the exhaustion avoidance processing, the life leveling processing, and the I/O performance rebalance processing are allowed between the compressed RG and the noncompressed RG. The user or the manager selects the migration policy according to intended purpose through the host computer 30, the management computer, or the like, in units of predetermined storage area (for example, in units of RG or LU), and processing in accordance with the selected migration policy may be performed by the storage apparatus 10.

Further, the data size of data compressed by an application of the host computer 30 is unchanged even if the data is compressed in the SSD 700 of the storage apparatus 10 again. Therefore, an interface that notifies whether the data has already been compressed, from the host computer 30 to the storage controller 100, is prepared, and the storage controller 100 may determine necessity of compression, based on the information, determine to which of the compressed RG and the noncompressed RG the data is to be stored, or determine the migration policy of the life leveling processing. Here, the interface to be prepared may include a field that indicates whether data has already been compressed, in the write request command transmitted from the host computer 30 to the storage controller 100.

REFERENCE SIGNS LIST

10 Storage apparatus
11 Disk
30 Host computer
100 Storage controller
700 SSD
710 SSD controller
780 Flash memory
781 Flash controller
10000 Storage system

The invention claimed is:

1. A storage system comprising:
a plurality of storage apparatuses,
each storage apparatus including:
  a storage medium configured to store data, and
  a controller configured to compress data and store the compressed data in the storage medium,
the each storage apparatus storing internal information which includes information denoting a storage capacity of the storage medium and information denoting a compressed data amount, the compressed data amount being an amount of compressed data, and
a whole storage capacity of the plurality of storage apparatuses and a use amount of the each storage apparatus being managed based on the internal information collected from the each storage apparatus,
wherein the internal information in the each storage apparatus includes information denoting a write data amount, the write data amount being amount of write data before being compressed by the controller, and
wherein for at least one of the plurality of storage apparatuses,
  a free capacity thereof is calculated based on the storage capacity of the storage medium and the compressed data amount of the storage apparatus, and
  a capacity exhaustion risk, which is a risk of exhaustion of a capacity of the storage medium, is calculated based on the write data amount and the free capacity of the storage apparatus.

2. The storage system according to claim 1, wherein the storage medium is a semiconductor storage medium, and
the internal information in the each storage apparatus includes life information denoting a life of the semiconductor storage medium.

3. The storage system according to claim 2, further comprising:
a storage controller configured to collect the internal information from the each storage apparatus, and manage the whole storage capacity of the plurality of storage apparatuses and the use amount of the each storage apparatus.

4. The storage system according to claim 1, further comprising:
a storage controller configured to collect the internal information from the each storage apparatus, and manage the whole storage capacity of the plurality of storage apparatuses and the use amount of the each storage apparatus.

5. A management method for managing a storage system which comprises a plurality of storage apparatuses, each storage apparatus including a storage medium configured to store data and a controller configured to compress data and store the compressed data in the storage medium, the management method comprising:

storing internal information, by the each storage apparatus, which includes information denoting a storage capacity of the storage medium and information denoting a compressed data amount, the compressed data amount being an amount of compressed data, managing a whole storage capacity of the plurality of storage apparatuses and a use amount of the each storage apparatus based on the internal information collected from the each storage apparatus, wherein for at least one of the plurality of storage apparatuses:

calculating a free capacity thereof based on the storage capacity of the storage medium and the compressed data amount of the storage apparatus, the internal information in the each storage apparatus including information denoting a write data amount, the write data amount being an amount of write data before being compressed by the controller, and calculating a capacity exhaustion risk, which is a risk of exhaustion of a capacity of the storage medium, based on the write data amount and the free capacity of the storage apparatus.

6. The management method according to claim 5, wherein the storage medium is a semiconductor storage medium, the internal information in the each storage apparatus includes life information denoting a life of the semiconductor storage medium.

7. The management method according to claim 6, wherein collection of the internal information for the each storage apparatus, and management of the whole storage capacity of the plurality of storage apparatuses and the use amount of the each storage apparatus is executed by a storage controller.

8. The management method according to claim 5, wherein collection of the internal information for the each storage apparatus, and management of the whole storage capacity of the plurality of storage apparatuses and the use amount of the each storage apparatus is executed by a storage controller.

\* \* \* \* \*